(12) United States Patent
Yamamoto

(10) Patent No.: US 9,305,081 B2
(45) Date of Patent: Apr. 5, 2016

(54) INFORMATION PROCESSING DEVICE

(75) Inventor: Kosuke Yamamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 566 days.

(21) Appl. No.: 13/510,831

(22) PCT Filed: Oct. 13, 2010

(86) PCT No.: PCT/JP2010/006069
§ 371 (c)(1),
(2), (4) Date: May 18, 2012

(87) PCT Pub. No.: WO2011/061890
PCT Pub. Date: May 26, 2011

(65) Prior Publication Data
US 2012/0226703 A1  Sep. 6, 2012

(30) Foreign Application Priority Data

Nov. 20, 2009 (JP) ................................. 2009-264760
Feb. 5, 2010 (JP) ................................. 2010-024035

(51) Int. Cl.
*G06F 17/30* (2006.01)
(52) U.S. Cl.
CPC .... *G06F 17/30699* (2013.01); *G06F 17/30702* (2013.01); *G06F 17/30705* (2013.01)

(58) Field of Classification Search
CPC ................... G06F 17/30699; G06F 17/30702
USPC ................................................. 707/748, 749
See application file for complete search history.

(56) References Cited

U.S. PATENT DOCUMENTS 8,306,922 B1 * 11/2012 Kunal et al. ................... 705/319

FOREIGN PATENT DOCUMENTS

WO    2009/020092 A1    2/2009

OTHER PUBLICATIONS

Kei Shiratsuchi, et al., "Information recommendation using social bookmark service", IPSJ SIG Technical Report, Information Processing Society of Japan, 2006, pp. 15-20, vol. 84.
Takuya Shimizu, et al., "A Basic Study on Discovery-oriented Algorithm for Collaborative Filtering", IPSJ SIG Technical Report, Information Processing Society of Japan, 2006, pp. 53-60, vol. 59.
Stuart E. Middleton, et al., "Ontological User Profiling in Recommender Systems", ACM Transactions on Information Systems, Association for Computing Machinery, 2004, pp. 1-39, vol. 22, No. 1.

(Continued)

*Primary Examiner* — Thu-Nguyet Le
(74) *Attorney, Agent, or Firm* — Sughrue Mion, PLLC

(57) ABSTRACT

An information processing device 900 is equipped with an attribute value estimating part 901 configured to, based on at attribute value associated with a connection object that is an object connected to an estimation target object that is one object in a universal set including a plurality of objects associated with an attribute value that is a value representing the possession or absence of an attribute, estimate an attribute value associated with the estimation target object.

19 Claims, 9 Drawing Sheets

(56) References Cited

OTHER PUBLICATIONS

Jun Karamon, et al., "Generating Social Network Features for Link-based Classification", Transactions of Information Processing Society of Japan Ronbunshi Journal, Jun. 15, 2008, pp. 2212-2223, vol. 49, No. 6.

Lars Backstrom, et al., "Group Formation in Large Social Networks: Membership, Growth, and Evolution", Proceedings of the 12th ACM SIGKDD International Conference on Knowledge Discovery and Data Mining, Research Track Paper, 2006, pp. 44-54.

\* cited by examiner

| OBJECT ID | GOLF | TENNIS | LACROSSE | SOCCER |
|---|---|---|---|---|
| A | 1 | 1 | | |
| B | | | 1 | 1 |
| C | | | 1 | |
| D | 1 | 1 | | |
| E | 1 | | | 1 |
| F | | 1 | | |
| G | | 1 | | 1 |
| H | 1 | | | |
| I | 1 | 1 | | 1 |
| J | | | | 1 |
| : | | | | |
| X | | | | |

| GOLF | TENNIS | LACROSSE | SOCCER |
|---|---|---|---|
| 0.2 | 0.3 | 0.01 | 0.3 |

| HOP COUNT | CONNECTION OBJECT ID |
|---|---|
| 1 | A, B, C, D |
| 2 | E, F, G, H, I, J |

| GOLF | TENNIS | LACROSSE | SOCCER |
|---|---|---|---|
| 0.5 | 0.5 | 0.2 | 0.5 |

Fig.11
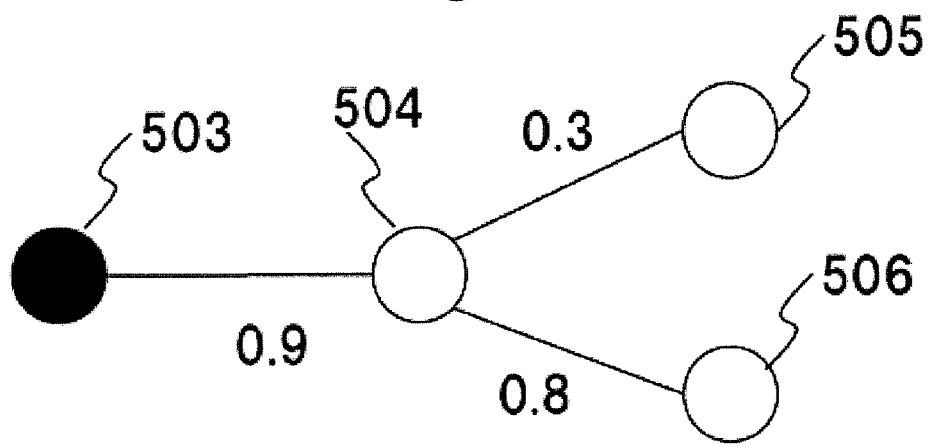
Fig.12
| GOLF | TENNIS | LACROSSE | SOCCER |
|------|--------|----------|--------|
| 0.35 | 0.35   | 0.2      | 0.3    |
Fig.13
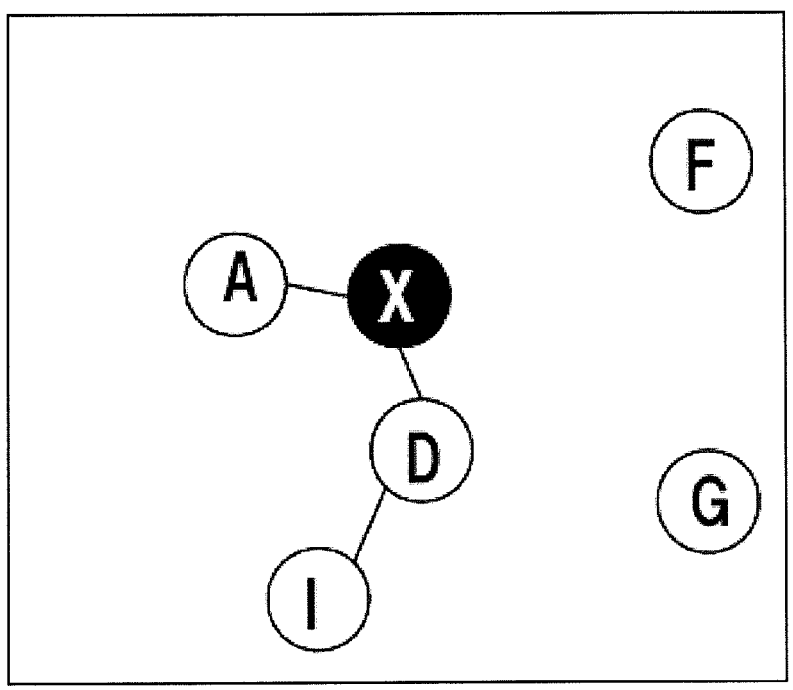

Fig.14
| GOLF | TENNIS | LACROSSE | SOCCER |
|---|---|---|---|
| 0.5 | 0.3 | 0.2 | 0.1 |
Fig.15A
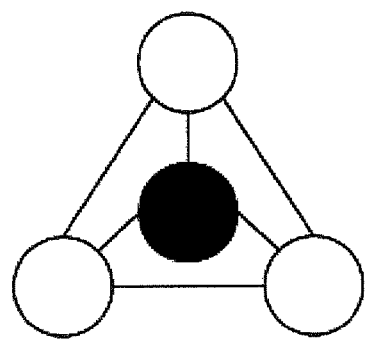
Fig.15B
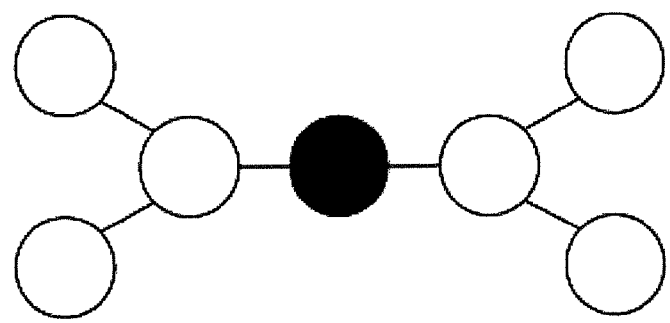
Fig.16
| GOLF | TENNIS | LACROSSE | SOCCER |
|---|---|---|---|
| 2.5 | 1.7 | 20 | 1.7 |

| GOLF | TENNIS | LACROSSE | SOCCER |
|---|---|---|---|
| 2.5 | 1 | 20 | 0.33 |

| CONNECTION OBJECT ID | EXTERNAL CONNECTION OBJECT ID |
|---|---|
| A | B, E, J |
| B | A |
| C | F, G |
| D | I, H |

| GOLF | TENNIS | LACROSSE | SOCCER |
|---|---|---|---|
| 0.1 | 0.6 | 0.4 | 0.4 |

| GOLF | TENNIS | LACROSSE | SOCCER |
|------|--------|----------|--------|
| 0.2  | 0.2    | 0.6      | 0.4    |

INFORMATION PROCESSING DEVICE

CROSS REFERENCE TO RELATED APPLICATIONS

This application is a National Stage of International Application No. PCT/JP2010/006069, filed on Oct. 20, 2010, which claims priority from Japanese Patent Application Nos. 2009-264760, filed on Nov. 20, 2009 and 2010-024035 filed on Feb. 5, 2010, the contents of all of which are incorporated herein by reference in their entirety.

TECHNICAL FIELD

The present invention relates to an information processing device configured to estimate an attribute value associated with an object.

BACKGROUND ART

There is a known information processing device configured to estimate an attribute value associated with an estimation target object that is one object in a universal set containing a plurality of objects associated with an attribute value that is a value representing whether an object has an attribute. One of information processing devices of this type is applied to a universal set in which each object is associated with a plurality of attribute values each representing whether the object has each of a plurality of attributes.

This information processing device extracts an object whose attribute value for a certain attribute is the same as (or similar to) that of an estimation target object. Then, based on an attribute value for another attribute associated with the extracted object, the information processing device estimates an attribute value for the attribute associated with the estimation target object.

For example, an information processing device described in Non-Patent Document 1 as one of information processing devices of this type, based on the similarity of social bookmarks as attribute values registered by users (consumers) as objects, extracts users having similar interest. Then, this information processing device estimates an attribute value associated with a user (an estimation target object) as an estimation target based on information representing a commercial product or service as an attribute value associated with the extracted user. Moreover, information processing devices configured to execute similar estimation processes are described in Non-Patent Documents 2 and 3.

[Non-Patent Document 1] Kei Shiratsuchi, Shinichiro Yoshii, and Masashi Furukawa, "Information Recommendation Using Social Bookmark Service," IPSJ SIG Notes, Information Processing Society of Japan, 2006, Volume 84, pp. 15-20

[Non-Patent Document 2] Takuya Shimizu, Toshinori Hijikata, and Shogo Nishida, "A Basic Study on Discovery-oriented Algorithm for Collaborative Filtering," IPSJ SIG Notes, Information Processing Society of Japan, 2006, Volume 59, pp. 53-60

[Non-Patent Document 3] Stuart E. Middleton, Nigel R. Shadbolt, and David C. De Roure, "Ontological User Profiling in Recommender Systems," ACM Transactions on Information Systems, Association for Computing Machinery, 2004, Volume 22, No. 1, pp. 54-88

However, there is a case that any object associated with the same object value as (or a similar object value to) an attribute value associated with an estimation target object does not exist regarding any attribute or any attribute value associated with an estimation target object does not exist. In these cases, there is a problem that the information processing devices described above cannot estimate an attribute value associated with an estimation target object.

SUMMARY

Accordingly, an object of the present invention is to provide an information processing device which can solve the aforementioned problem, "occurrence of a situation in which an attribute value associated with an estimation target object cannot be estimated."

In order to achieve the object, an information processing device of an exemplary embodiment of the present invention includes an attribute value estimating means for, based on an attribute value associated with a connection object that is an object connected with an estimation target object that is one object in a universal set including a plurality of objects each associated with an attribute value that is a value representing possession or absence of an attribute, estimating an attribute value associated with the estimation target object.

With the configurations described above, the present invention can inhibit occurrence of a situation in which an attribute value associated with an estimation target object cannot be estimated.

BRIEF DESCRIPTION OF DRAWINGS

FIG. 11 is a view conceptually showing connection strength according to a modified example of the first exemplary embodiment of the present invention;

FIG. 12 is a table showing connection set internal density according to the modified example of the first exemplary embodiment of the present invention;

FIG. 13 is a view conceptually showing connection information relating to connection objects having "tennis" as an attribute among connection information, in the form of a graph;

FIG. 14 is a table showing connection set internal density according to the modified example of the first exemplary embodiment of the present invention;

FIG. 15A is a view conceptually showing an example of a prescribed shape;

FIG. 15B is a view conceptually showing an example of a prescribed shape;

FIG. 16 is a table showing an uneven-distribution degree calculated by an attribute value estimating part according to the first exemplary embodiment of the present invention;

EXEMPLARY EMBODIMENTS

Below, respective exemplary embodiments of an information processing device, an information processing method and a program according to the present invention will be described with reference to FIGS. 1 to 23.

First Exemplary Embodiment

An information processing device according to a first exemplary embodiment is applied to a universal set containing a plurality of users as objects each associated with an attribute value, which is a value representing the possession of a hobby (a taste) as an attribute.

In this description, one object which is in a universal object and whose attribute value is a target for estimation by the information processing device will be referred to as an estimation target object. Moreover, an object connected with an estimation target object will be referred to as a connection object. In this exemplary embodiment, when a certain object is connected with an estimation target object, it corresponds to that the frequency of transmission and reception of information between the object and the estimation target object is equal to or more than a threshold value. When a certain object is connected with an estimation target object, it may correspond to that the possibility of transmission and reception of information between the object and the estimation target object is equal to or more than a threshold value.

An estimation target object and a connection object influence each other. Therefore, an estimation target object and a connection object have hobbies in common with relatively high possibility. Thus, this information processing device estimates an attribute value associated with an estimation target object, based on an attribute value associated with a connection object. Consequently, the attribute value associated with the estimation target object is estimated with high accuracy.

The information processing device according to the present invention may be applied to a universal set containing a plurality of objects other than users. For example, the information processing device may be applied to a universal set containing a plurality of documents (e.g., information compliant with HTML (HyperText Markup Language)) as objects. In this case, attributes are keywords appearing in the documents. Moreover, in this case, when a certain object is connected with an estimation target object, it corresponds to that at least one of the object and the estimation target object refers to the other.

Below, a configuration and operation of the information processing device according to the first exemplary embodiment and a modified example thereof will be described in detail with reference to FIGS. 1 to 17.

(Configuration)

Figure 1:
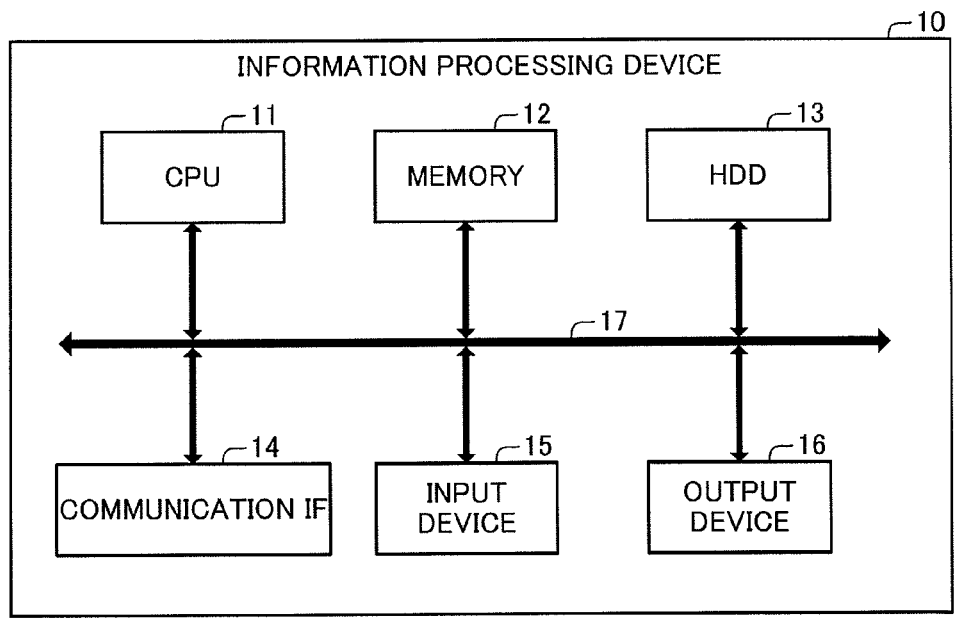
FIG. 1 is a diagram showing a schematic configuration of an information processing device according to a first exemplary embodiment of the present invention.

FIG. 1 is a diagram showing a schematic configuration of an information processing device 10 according to the first exemplary embodiment of the present invention. As shown in FIG. 1, the information processing device 10 has a central processing unit (CPU) 11, a memory 12, a hard disk drive (HDD) 13, a communication interface (IF) 14, an input device 15, and an output device 16. The memory 12 and the HDD 13 configure a storage device.

The CPU 11, the memory 12, the HDD 13, the communication IF 14, the input device 15 and the output device 16 are connected with each other via a bus 17 to input and output data (transmit and receive data with each other). The communication IF 14 is an interface for connecting with an external network. The input device 15 is, for example, a keyboard and a mouse. The output device 16 is, for example, a display. A function of the information processing device 10 is realized by execution of a program stored in the memory 12 or the HDD 13 by the CPU 11.

(Function)

Figure 2:
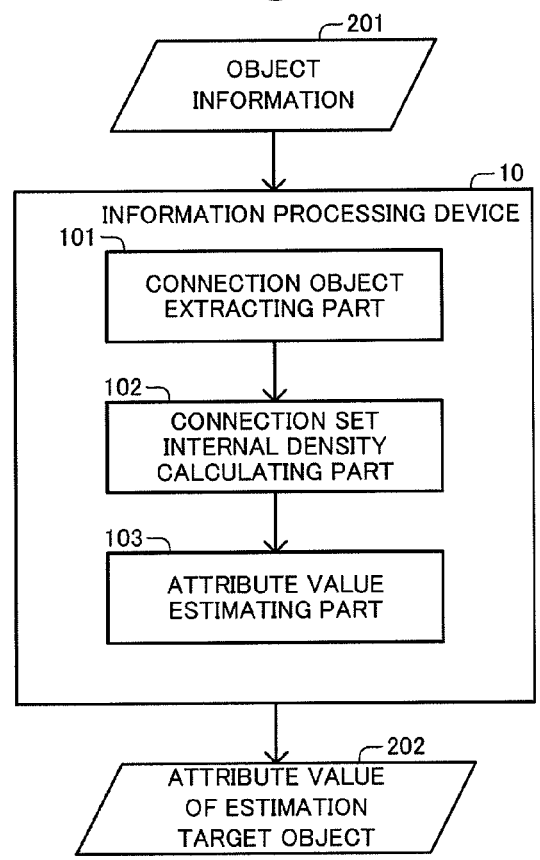
FIG. 2 is a block diagram schematically showing a function of the information processing device according to the first exemplary embodiment of the present invention.

FIG. 2 is a block diagram showing a function of the information processing device 10 according to the first exemplary embodiment. The function of the information processing device 10 includes a connection object extracting part (a connection object extracting means) 101, a connection set internal density calculating part (a connection set internal density calculating means) 102, and an attribute value estimating part (an attribute value estimating means) 103.

Figures 3, 4:
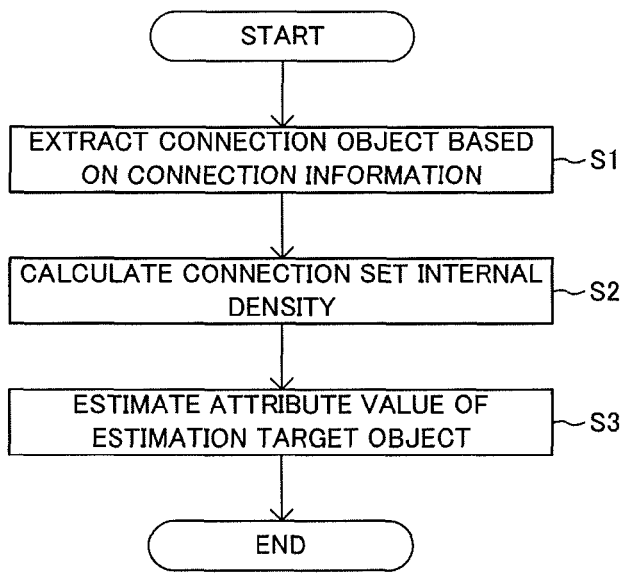
FIG. 3 is a flowchart showing the outline of a process executed by the information processing device according to the first exemplary embodiment of the present invention.
FIG. 4 is a table showing an example of connection information according to the first exemplary embodiment of the present invention.

As shown in FIG. 2, object information 201 is data inputted into the information processing device 10, and an attribute value 202 of an estimation target object is data outputted from the information processing device 10. FIG. 3 is a flowchart showing the outline of a process executed by the CPU 11 of the information processing device 10.

Hereinafter, with reference to FIGS. 2 and 3, the function of the information processing device 10 will be described.

The object information 201 includes connection information regarding each of all object pairs in a universal set, profile information associated with an object other than an estimation target object among the objects in the universal set, and universal set internal density.

Each of the object pairs is composed of any two objects in the universal set. Moreover, the connection information shows whether the two objects composing the object pair are connected. In this exemplary embodiment, the connection information includes a truth value for each of the object pairs. When the connection information is 0, it represents that the two objects are not connected. On the other hand, when the connection information is 1, it represents that the two objects are connected. The connection information may include connection strength which represents the strength of connection of the two objects composing the object pair. In this case, for example, the connection strength is a real number that is equal to or more than 0 and equal to or less than 1. When the connection strength is 0, it represents that the two objects are not connected. On the other hand, when the connection strength is 1, it represents that the two objects are connected most strongly.

Further, the universal set internal density has a value that becomes larger as the ratio of the number of objects each associated with an attribute value representing the possession of an attribute among the objects in the universal set to the number (the total number) of the objects in the universal set becomes larger. In this exemplary embodiment, the universal set internal density is a value as the result of dividing the number of the objects associated with the attribute value representing the possession of the attribute among the objects in the universal set by the number of the objects in the universal set. That is to say, the universal set internal density is a real number that is equal to or more than 0 and equal to or less than 1.

The information processing device 10 accepts an input of object information and stores the inputted object information into the storage device. In this exemplary embodiment, the information processing device 10 stores object identification information (object ID) for identifying an object as a user and connection object identification information (connection object ID) for identifying an object (a connection object) connected with the object, in association with each other.

In this exemplary embodiment, the information processing device 10 stores object ID of each object and connection object ID of all connection objects connected to the object, in association with each other. The information processing device 10 may be configured to store a pair of object ID of each of two objects connected to each other. Moreover, the information processing device 10 may be configured to store a matrix (an adjacency matrix) composed of truth values representing whether objects corresponding to a row and objects corresponding to a column are connected to each other.

The profile information includes an attribute value of each of a plurality of attributes. In this exemplary embodiment, the profile information is a vector with an attribute value for each of the attributes as an element. In this exemplary embodiment, the profile information includes an attribute value for each of "golf," "tennis," "lacrosse" and "soccer" as the attributes. The attributes may be "car," "PC," "restaurant," "sport," "comic," "movie," "music," "game," or the like.

The attribute value is a value that becomes larger as the strength of a degree that an object has an attribute becomes larger. The strength of a degree that an object has an attribute corresponds to the strength of an interest of a user in a hobby as an attribute. In this exemplary embodiment, the attribute value is a real value that is equal to or more than 0 and equal to or less than 1. When the attribute value is 0, it represents that the user does not have the attribute. On the other hand, when the attribute value is 1, it represents that the user has the attribute at the strongest degree (the user has an interest in the hobby at the highest degree). The attribute value may be a truth value representing only whether an object has an attribute or not.

Further, the attributes may be hierarchized. For example, as lower layers of an attribute "noodle," attributes such as "the hardness of noodles" "the thickness of noodles" "the type of soup" "how hot" and "light taste or heavy taste" may be arranged. In a case that the attributes are thus hierarchized, it is preferred that the information processing device 10 separates data for each parent attribute (it corresponds to "noodle" in the above example) configuring one layer and, regarding a set of child attributes therein as one vector, executes a process described below for each parent attribute.

The information processing device 10 may be configured to receive the connection information of the object information 201 from an information processing system (e.g., a system which realizes an SNS (Social Network Service)) on the Internet via the communication IF 14. Moreover, the information processing device 10 may be configured to acquire an address book (information for specifying a terminal device of a communication destination; a mail address, a telephone number, or the like) stored by a terminal device of the user. Moreover, the information processing device 10 may be configured so that a user as an object, an administrator of the information processing device 10, or the like registers and/or corrects the connection information via the input device 15.

Further, the information processing device 10 may be configured to receive the profile information of the object information 201 from an information processing system (e.g., a system which realizes an SNS (Social Network System), a system that realizes a blog, an electronic commerce system, or the like) on the Internet via the communication IF 14. The information processing device 10 may be configured to generate the profile information based on information representing a commercial product buying history, a web site browsing history, a web site inputting history, or the like, received from the information processing system on the Internet.

To be specific, the information processing device 10 may generate profile information in which a commercial product is an attribute and an attribute value for a bought commercial product is "1" based on info illation representing a commercial product buying history. Moreover, the information processing device 10 may generate profile information in which a keyword included in a browsed web site or a keyword included in inputted information is an attribute. Moreover, the information processing device may be configured so that a user as an object, an administrator of the information processing device 10, or the like registers and/or corrects the profile information via the input device 15.

Further, the information processing device 10 may be configured so that a user as an object, an administrator of the information processing device 10, or the like registers and/or corrects universal set internal density via the input device 15.

FIG. 4 shows an example of connection information that the information processing device 10 stores into the storage device. In this exemplary embodiment, the information processing device 10 stores object ID of each object and connection object ID of all connection objects directly connected with the object, in association with each other. Moreover, FIG. 5 is a view conceptually showing the connection information shown in FIG. 4 in the form of a graph in which the directly connection objects are connected by straight lines.

Figures 5, 6:
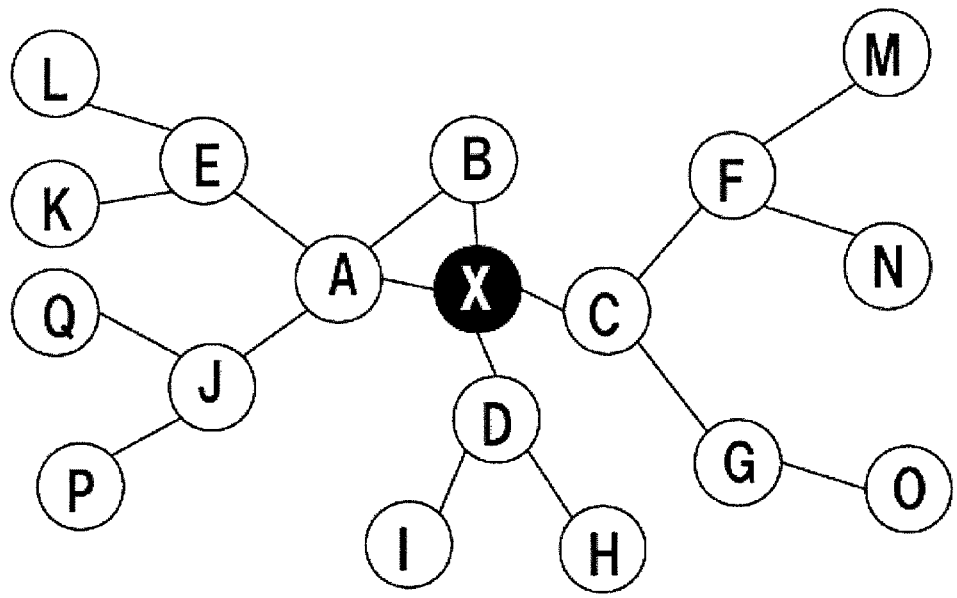
FIG. 5 is a view conceptually showing the connection information shown in FIG. 4 in the form of a graph in which directly connection objects are connected by straight lines.
FIG. 6 is a table showing an example of profile information according to the first exemplary embodiment of the present invention.

In FIGS. 4 and 5, a capital-letter alphabet represents object ID. Moreover, "X" represents object ID for identifying an estimation target object. When the connection information includes the connection strength, it is preferred that the information processing device 10 stores a pair of object ID for each of two objects connected to each other and the connection strength in association with each other. Moreover, in this case, the information processing device 10 may be configured to store a matrix (an adjacency matrix) in which the connection strength regarding a connection between objects corresponding to a row and objects corresponding to a column is an element.

FIG. 6 shows an example of the profile information that the information processing device 10 stores into the storage device. In this exemplary embodiment, a blank represents that the attribute value is "0." In this exemplary embodiment, the attributes are "golf," "tennis," "lacrosse" and "soccer." The attribute values associated with object ID "A" are "1" for "golf," "1" for "tennis," "0" for "lacrosse," and "0" for "soccer." That is to say, a user identified by the object ID "A" is interested in "golf" and "tennis," but not interested in "lacrosse" or "soccer."

Figures 7, 8, 9, 10:
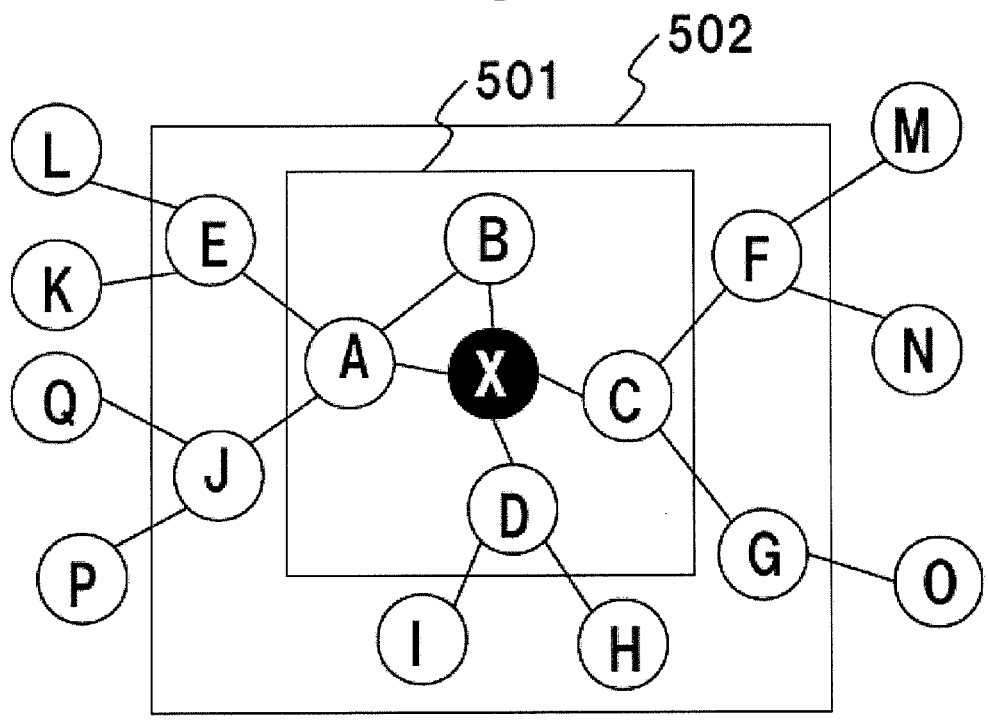
FIG. 7 is a table showing an example of universal set internal density according to the first exemplary embodiment of the present invention.
FIG. 8 is a view conceptually showing connection objects extracted by a connection object extracting part according to the first exemplary embodiment of the present invention.
FIG. 9 is a table showing a hop count and connection object ID which are stored by the information processing device according to the first exemplary embodiment of the present invention.
FIG. 10 is a table showing connection set internal density calculated by a connection set internal density calculating part according to the first exemplary embodiment of the present invention.

FIG. 7 shows an example of universal set internal density that the information processing device 10 stores into the storage device. As shown in FIG. 7, the information processing device 10 stores universal set internal density in association with each of the attributes.

(Connection Object Extracting Part)

The connection object extracting part 101 extracts a connection object connected with an estimation target object from among objects in a universal set based on the connected information stored in the storage device. A process executed by the connection object extracting part 101 corresponds to a process of step S1 of FIG. 3. In this exemplary embodiment, the connection object extracting part 101 extracts an object whose hop count is more than a preset threshold hop count, as a connection object from among objects connected with an estimation target object.

In a case that an estimation target object and an object are connected via another object (a via-object), a hop count is a value as the result of adding "1" to the number of via-objects in a shortest path to reach the estimation target object from the object. Moreover, in a case that an estimation target object and an object are connected not via another object (a via-object) (i.e., connected directly), a hop count is "1."

It can be said that as a hop count regarding a connection between an estimation target object and an object becomes larger, the strength of the connection between the estimation target object and the object becomes weaker. Therefore, it can be said that extraction by the connection object extracting part 101 of an object other than an object whose hop count is larger than a threshold hop count among objects connected to the estimation target object as a connection object corresponds to correction of connection set internal density to a smaller value as the strength of the connection between the estimation target object and the connection object becomes weaker, as described later.

The connection object extracting part 101 preliminarily stores the threshold hop count. The threshold hop count may be a value inputted by the administrator of the information processing device 10 via the input device 15.

Furthermore, the connection object extracting part 101 outputs information representing the extracted connection object to the connection set internal density calculating part 102.

A specific process extracted by the connection object extracting part 101 will be described.

First, the connection object extracting part 101 accepts object ID (herein, "X") inputted by the administrator of the information processing device 10, as object ID for identifying an estimation target object. The connection object extracting part 101 may be configured to acquire object ID that an attribute value is not included in the stored profile information and accept the acquired object ID as object ID for identifying an estimation target object.

Then, the connection object extracting part 101 acquires connection object ID ("A," "B," "C" and "D") associated with the object ID "X" that are included in the connected information stored as shown in FIG. 4. An object identified by each of the acquired connection object ID "A," "B," "C" and "D" is an object connected to the estimation target object ("X") by a hop count "1" (i.e., directly connected). Next, the connection object extracting part 101 stores the acquired connection object ID ("A," "B," "C" and "D") into the storage device.

Then, in a like manner, for each of the acquired connection object ID ("A," "B," "C" and "D"), the connection object extracting part 101 acquires connection object ID associated with the object ID included in the stored connected information. Next, the connection object extracting part 101 stores connection object ID other than the already stored connection ID among the acquired connection object ID, into the storage device. At this moment, an object identified by the connection object ID stored into the storage device is an object connected with the estimation target object ("X") by a hop count "2."

The connection object extracting part 101 executes such a process repeatedly for the threshold hop count, and thereby extracts an object other than an object whose hop count is larger than the threshold hop count among the objects connected with the estimation target object, as a connection object.

FIG. 8 is a view conceptually showing connection objects extracted by the connection object extracting part 101. In FIG. 8, objects within a rectangular region 501 are connection objects extracted in a case that the threshold hop count is set to "1." Moreover, objects within a rectangular region 502 are connection objects extracted in a case that the threshold hop count is set to "2."

Then, the connection object extracting part 101 outputs the stored connection object ID to the connection set internal density calculating part 102. In this exemplary embodiment, as shown in FIG. 9, the connection object extracting part 101 stores a hop count and connection object ID in association with each other into the storage device, and also outputs the hop count and the connection ID in association with each other to the connection set internal density calculating part 102.

A modified example of the connection object extracting part 101 will be described.

It is preferred that the connection object extracting part 101 is configured to extract a connection object based on connection strength in a case that the connection information includes the connection strength. For example, in a case that an object is a user, the connection strength is a value corresponding to the frequency of transmission and reception of information between users, the possibility of transmission and reception of information between users, and so on. Moreover, in a case that an object is a document, the connection strength is a value corresponding to the frequency that the document refers to another document.

To be specific, it is possible to use, as the connection strength, a value calculated based on the frequency of browsing other users' diaries, the frequency of commenting on other users' diaries, the frequency of transmitting e-mails to other users, and so on in an SNS. Moreover, it is also possible to use, as the connection strength, a value calculated based on the frequency of calling, the frequency of transmitting mails, and so on in a mobile terminal.

That is to say, users connected with relatively large connection strength transmit and receive information with high frequency. In other words, it is highly possible that such users strongly influence each other. Thus, the connection object extracting part 101 may be configured to extract only an object connected with an estimation target object with relatively large connection strength, as a connection object.

To be specific, the connection object extracting part 101 calculates a value as the result of multiplying all the connection strength regarding connections each configuring a shortest path to reach an estimation target object from an object connected with the estimation target object, as the connection strength regarding the connection between the object and the estimation target object. Then, in a case that the calculated connection strength is larger than preset first threshold strength, the connection object extracting part 101 extracts the object as a connection object. The first threshold strength may be a value inputted by the administrator of the information processing device 10.

According to this exemplary embodiment, depending on the strength of a connection between an estimation target object and a connection object, it is possible to properly determine whether a distribution of objects associated with an attribute value representing the possession of an attribute is weighted toward a connection set in a universal set.

Further, the connection object extracting part 101 may be configured to, in a case that connection strength regarding a connection between two objects is smaller than preset second threshold strength, process the two objects as objects which are not connected with each other. Consequently, it is possible to reduce a processing load on the information processing device 10.

Further, the connection object extracting part 101 may be configured to extract a different number of connection objects depending on an attribute. In this case, it is preferred that the connection object extracting part 101 is configured to extract a smaller number of connection objects for a certain attribute as universal set internal density regarding the attribute becomes smaller. To be specific, it is preferred that the connection object extracting part 101 uses a smaller threshold hop count for a certain attribute as universal set internal density regarding the attribute becomes smaller. Moreover, it is preferred that the connection object extracting part 101 uses larger first threshold strength for a certain attribute as universal set internal density regarding the attribute becomes smaller.

When universal set internal density regarding a certain attribute is relatively small, the number of objects having the attribute is relatively small with high possibility. Therefore, in such a case, if extracting an extremely large number of connection objects, it is impossible to properly determine whether a distribution of objects associated with an attribute value representing the possession of the attribute is weighted toward a connection set in the universal set. Accordingly, by thus configuring the information processing device, it is possible to properly determine whether a distribution of objects associated with an attribute value representing the possession of the attribute is weighted toward a connection set in the universal set.

Further, the connection object extracting part 101 may be configured to extract all objects connected with an estimation target object, as connection objects.

(Connection Set Internal Density Calculating Part)

The connection set internal density calculating part 102 accepts connection object ID outputted by the connection object extracting part 101. The connection set internal density calculating part 102 calculates connection set internal density for each attribute based on the accepted connection object ID.

A process executed by the connection set internal density calculating part 102 corresponds to a process of step S2 of FIG. 3.

In this exemplary embodiment, the connection set internal density calculating part 102 calculates connection set internal density having a value that becomes larger as the ratio of the number of objects associated with an attribute value representing the possession of an attribute among connection objects identified by the accepted connection object ID (i.e., among objects in the connection set) to the number of the connection objects becomes larger. To be specific, the connection set internal density calculating part 102 calculates a value as the result of dividing the number of objects associated with an attribute value representing the possession of an attribute among objects in a connection set by the number (the total number) of the objects in the connection set, as connection set internal density.

That is to say, the connection set internal density calculating part 102 calculates connection set internal density $c_k$ for a $k^{th}$ attribute based on an equation (1) shown below. Herein, $p_{ik}$ (denotes an attribute value for the $k^{th}$ attribute associated with an object. Moreover, N denotes the number of objects in a connection set.

[Equation 1]

$$c_k = \frac{\sum_{i \in N} p_{ik}}{|N|} \qquad (1)$$

In the above equation, $p_{ik}$ may be an integer of 0 or 1, or may be a real number equal to or more than 0 and equal to and less than 1.

Thus, the connection set internal density calculating part 102 calculates, as connection set internal density, a value that becomes larger as the sum of attribute values associated with objects in a connection set becomes larger and that becomes smaller as the total number of the objects in the connection set becomes larger.

Consequently, it is possible to properly determine depending on the strength of a degree that an object has an attribute (i.e., the magnitude of an attribute value) whether a distribution of objects associated with an attribute value representing the possession of the object is weighted toward a connection set in a universal set.

Further, the denominator of the right side of the above equation (1) may be the sum of the maximum values of $p_{ik}$ for an $i^{th}$ object regarding all i. Consequently, even when there exists an object associated with an attribute value representing the absence of an attribute regarding all attributes, it is possible to properly determine whether a distribution of objects associated with an attribute value representing the possession of the attribute is weighted toward a connection set in a universal set.

Then, the connection set internal density calculating part 102 outputs the calculated connection set internal density $c_k$ to the attribute value estimating part 103.

A specific process executed by the connection set internal density calculating part 102 will be described by taking, as an example, a case of accepting a hop count and connection object ID associated with each other as shown in FIG. 9.

Herein, a case that a threshold hop count is set to "2" is simulated.

The connection set internal density calculating part 102 counts connection object ID accepted from the connection object extracting part 101 to acquire the total number of connection objects. In this exemplary embodiment, the connection set internal density calculating part 102 accepts connection object ID "A" to "J," so that the acquired total number of connection objects is "10."

Next, the connection set internal density calculating part 102 acquires an attribute value associated with each of the connection object ID, based on the stored profile information (refer to FIG. 6). That is to say, in this exemplary embodiment, the connection set internal density calculating part 102 acquires an attribute value associated with each of the object ID "A" to "J."

Then, the connection set internal density calculating part 102 calculates connection set internal density $c_k$ for each attribute based on the acquired attribute value and the acquired total number of the connection objects. In this exemplary embodiment, the connection set internal density calculating part 102 calculates connection set internal density $c_k$ as shown in FIG. 10. That is to say, connection set internal density $c_k$ for each of attributes "golf," "tennis" and "soccer" is "0.5," and connection set internal density $c_k$ for an attribute "lacrosse" is "0.2."

A modified example of the connection set internal density calculating part 102 will be described.

It is highly possible that an estimation target object is more largely influenced by an object connected by a smaller hop count. Increase of a hop count for a connection between an estimation target object and a connection object corresponds to decrease of the strength of the connection between the estimation target object and the connection object. Thus, it is preferred that the connection set internal density calculating part 102 is configured to correct connection set internal density to a smaller value as a hop count becomes smaller.

To be specific, the connection set internal density calculating part 102 calculates connection set internal density $c_k$ based on an equation (2) shown below. In this equation, w(i) denotes a weight value that has a larger value as a hop count for a connection between an $i^{th}$ object and an estimation target object becomes smaller. For example, w(i) is an inverse for a hop count.

[Equation 2]

$$c_k = \frac{\sum_{i \in N} w(i) p_{ik}}{\sum_{i \in N} w(i)} \quad (2)$$

The denomination on the right side of the above equation (2) may be the sum of the products of the maximum value of $p_{ik}$ for an $i^{th}$ object and a weight value w(i) regarding all i. Moreover, w(i) may be a value inputted by the administrator of the information processing device 10.

A specific process executed by the modified example of the connection set internal density calculating part 102 mentioned above will be described by taking, as an example, a case of accepting a hop count and connection object ID associated with each other as shown in FIG. 9.

For each connection object, the connection set internal density calculating part 102 calculates an inverse for a hop count accepted from the connection object extracting part 101, as a weight value w(i). Next, the connection set internal density calculating part 102 acquires an attribute value associated with each of the accepted connection object ID, based on the stored profiled information (refer to FIG. 6). That is to say, in this exemplary embodiment, the connection set internal density calculating part 102 acquires an attribute value associated with each of object ID "A" to "J."

Then, the connection set internal density calculating part 102 calculates connection set internal density $c_k$ for each attribute based on the above equation (2), the acquired attribute value, and the calculated weight value w(i). In this exemplary embodiment, the connection set internal density calculating part 102 calculates connection set internal density $c_k$ as shown in FIG. 12. That is to say, connection set internal density $c_k$ regarding for each of attributes "golf" and "tennis" is "0.35," and connection set internal density $c_k$ regarding an attribute "lacrosse" is "0.2," and connection set internal density $c_k$ regarding an attribute "soccer" is "0.3"

Thus, connection set internal density $c_k$ regarding an attribute of an object connected with an estimation target object by a smaller hop count is a relatively larger value. That is to say, the ratio of connection set internal density $c_k$ regarding "lacrosse," which is an attribute that both the objects "B" and "C" directly connected with an estimation target object have in common, to connection set internal density $c_k$ regarding another attribute is larger than that calculated based on the equation (1).

Further, the connection set internal density calculating part 102 may be configured to use connection strength as w(i) in a case that connection information includes connection strength. Connection strength is, for example, a value as the result of multiplying all connection strength for each connection configuring a shortest path to reach an estimation target object from a connection object.

FIG. 11 is a view conceptually showing connection strength in the above case. In FIG. 11, an estimation target object 503 and a connection object 504 are connected by connection strength "0.9." Moreover, the connection object 504 and a connection object 505 are connected by connection strength "0.3," and the connection object 504 and a connection object 506 are connected by connection strength "0.8."

In this case, a weight value w(i) for the connection object 504 is 0.9. Moreover, a weight value w(i) for the connection object 505 is 0.27 (=0.9×0.3). Likewise, a weight value w(i) for the connection object 506 is 0.72 (=0.9×0.8).

Thus, it can be said that the connection set internal density calculating part 102 is configured to correct connection set internal density to a smaller value as the strength of a connection between an estimation target object and a connection object becomes weaker. Consequently, it is possible to properly determine whether a distribution of objects associated with an attribute value representing the possession of the attribute is weighted toward a connection set in a universal set, depending on the strength of a connection between an estimation target object and a connection object.

Furthermore, another modified example of the connection set internal density calculating part 102 will be described.

There is a case that a connection object associated with an attribute value representing the possession of an attribute and an estimation target object are connected via another connection object (a via-connection object) (i.e., connected through another connection object). In this case, there is a case that the via-connection object is associated with the attribute value representing the possession of the attribute (a first case), and a case that the via-connection object is associated with an attribute value representing the absence of the attribute (a second case).

In the above case, it is more possible that the estimation target object has the attribute in the first case than in the second case. Therefore, it is preferred that the connection set internal density calculating part 102 is configured to correct connection set internal density to a smaller set as the number of connection objects which are connected with the estimation target object via a connection object associated with the attribute value representing the absence of the attribute and are associated with the attribute value representing the possession of the attribute becomes more. Consequently, it is possible to estimate an attribute value associated with the estimation target object with high accuracy.

Herein, a case that a threshold hop count is set to "2" is simulated. In this case, the connection object "F" has a high interest in the attribute "tennis" as shown in FIG. 6. The connection object "F" is connected with the estimation target object "X" via the connection object "C" as shown in FIG. 8. Moreover, the connection object "C" does not have a high interest in the attribute "tennis" as shown in FIG. 6. In this case, the connection set internal density calculating part 102 calculates connection set internal density $c_k$ by processing the connection object "F" as an object associated with an attribute value representing the absence of the attribute "tennis."

To be specific, the connection set internal density calculating part 102 calculates connection set internal density $c_k$ based on an equation (3) shown below. In this equation, $r(i)$ denotes a link value that is set to "1" when all objects on the way from an $i^{th}$ object to an estimation target object are associated with an attribute value representing the possession of the attribute and that is set to "0" in other cases.

[Equation 3]

$$c_k = \frac{\sum_{i \in N} r(i) p_{ik}}{|N|} \quad (3)$$

The denominator of the right side of the above equation (3) may be the sum of link values $r(i)$ regarding all i.

A specific process executed by the modified example of the connection set internal density calculating part 102 mentioned above will be described. The connection set internal density calculating part 102 acquires an attribute value associated with each of the connection object ID accepted from the connection object extracting part 102 based on the stored profile information (refer to FIG. 6). Then, for each attribute, the connection set internal density calculating part 102 extracts a connection object associated with an attribute value representing the possession of the attribute, based on the acquired attribute value.

Herein, a case that a threshold hop count is set to "2" will be simulated. In this case, the connection set internal density calculating part 102 extracts connection objects "A," "D," "F," "G" and "I" as connection objects having an attribute "tennis" as shown in FIG. 13.

Then, the connection set internal density calculating part 102 determines whether all objects on the way from each of the extracted connection objects to an estimation target object are associated with an attribute value representing the possession of the attribute, based on the connection information shown in FIG. 4. The connection set internal density calculating part 102 performs the determination described above by recursively following from the estimation target object to the connection object based on the connection information.

Consequently, the connection set internal density calculating part 102 acquires a link value $r(i)$. Then, the connection set internal density calculating part 102 calculates connection set internal density $c_k$ based on the above equation (3), the acquired link value $r(i)$, the acquired attribute value, and the total number N of the connection objects.

In this exemplary embodiment, the connection set internal density calculating part 102 calculates connection set internal density $c_k$ as shown in FIG. 14. That is to say, connection set internal density $c_k$ regarding an attribute "golf" is "0.5," connection set internal density $c_k$ regarding an attribute "tennis" is "0.3," connection set internal density $c_k$ regarding an attribute "lacrosse" is "0.2," and connection set internal density $c_k$ regarding an attribute "soccer" is "0.1." When compared with the value shown in FIG. 10, it appears that the connection set internal density $c_k$ regarding "soccer," which is an attribute that the number of via-connection objects associated with an attribute value representing the absence of an attribute is relatively large, is smaller.

Further, the connection set internal density calculating part 102 may be configured to calculate connection set internal density $c_k$ based on both a weight value $w(i)$ and a link value $r(i)$. In this case, it is preferred that the connection set internal density calculating part 102 calculates connection set internal density $c_k$ based on an equation (4) shown below.

[Equation 4]

$$c_k = \frac{\sum_{i \in N} r(i) w(i) p_{ik}}{\sum_{i \in N} r(i) w(i)} \quad (4)$$

Furthermore, the connection set internal density calculating part 102 according to the other modified example may be configured to correct connection set internal density $c_k$ based on the shape (the status) of a connection of connection objects with an estimation target object.

When objects directly connected with an estimation target object have a certain attribute, the estimation target object has the attribute with high possibility. Therefore, it is preferred that the connection set internal density calculating part 102 is configured to, when none of the objects directly connected to the estimation target object has a certain attribute, correct connection set internal density $c_k$ regarding the attribute to "0."

Further, it is preferred that the connection set internal density calculating part 102 is configured to, when the shape of a connection of connection objects having a certain attribute in common with an estimation target object coincides with a given shape set in advance, correct connection set internal density $c_k$ regarding the attribute to "1."

Information representing the given shape may be information inputted by the administrator of the information processing device 10. Moreover, the information processing device 10 may be configured to generate the information representing the given shape.

FIGS. 15A and 15B show examples of the given shape. In FIGS. 15A and 15B, a black circle represents an estimation target object, and white circles represent connection objects. The given shape shown in FIG. 15A is a shape that the estimation target object and the connection objects form a complete graph. Moreover, the given shape shown in FIG. 15B is a shape that the connection objects font a binary tree with the estimation target object as a root.

Further, the connection set internal density calculating part 102 may be configured to, when network density regarding a certain attribute is larger than threshold density set in advance, correct connection set internal density $c_k$ regarding the attribute to "1."

Network density is the ratio of the total number of link objects having a certain attribute to the total number of connection objects having the attribute. A link object is an object that has a certain attribute and that is connected with an estimation target object so that all via-objects in a shortest path to reach the estimation target object from the link object have the attribute. That is to say, network density is a real number equal to or more than 0 and equal to or less than 1.

Furthermore, it is preferred that the connection set internal density calculating part 102 is configured to set the threshold density to a smaller value as universal set internal density becomes smaller.

In a case that universal set internal density regarding a certain attribute is relatively small, it is highly possible that the number of objects having the attribute is relatively small. Therefore, in such a case, if the threshold density is set to an extremely large value, it is impossible to properly determine whether a distribution of objects associated with an attribute value representing the possession of the attribute is weighted toward a connection set in a universal set. Thus, by configuring the information processing device 10 as described above, it is possible to properly determine whether a distribution of objects associated with an attribute value representing the possession of the attribute is weighted toward a connection set in a universal set.

Likewise, the connection set internal density calculating part 102 may be configured to use a given shape that varies depending on universal set internal density.

(Attribute Value Estimating Part)

The attribute value estimating part 103 accepts connection set internal density $c_k$ outputted from the connection set internal density calculating part 102. Moreover, the attribute value estimating part 103 estimates an attribute value associated with an estimation target object for each attribute, based on the accepted connection set internal density $c_k$ and the stored universal set internal density. That is to say, based on an attribute value associated with a connection object that is an object connected with an estimation target object, the attribute value estimating part 103 estimates an attribute value associated with the estimation target object. A process executed by the attribute value estimating part 103 corresponds to a process of S3 of FIG. 3.

As the ratio of connection set internal density $c_k$ to universal set internal density regarding a certain attribute becomes higher (larger), the degree of uneven distribution of objects associated with an attribute value representing the possession of the attribute in a connection set configured by connection objects in a universal set becomes higher. Therefore, as the ratio of connection set internal density $c_k$ to universal set internal density becomes higher, an estimation target object has the object with higher possibility.

Thus, in this exemplary embodiment, when an uneven-distribution degree that is a value as the result of dividing connection set internal density $c_k$ by universal set internal density for each attribute is larger than a preset threshold distribution degree, the attribute value estimating part 103 estimates, as an attribute value associated with an estimation target object regarding the attribute, an attribute value representing the possession of the attribute. The threshold uneven-distribution degree may be a value inputted by the administrator of the information processing device 10.

Thus, the attribute value estimating part 103 determines for each attribute whether a distribution of objects associated with an attribute value representing the possession of the attribute is weighted toward a connection set in a universal set, based on connection set internal density $c_k$ and universal set internal density. Then, when it is determined that a distribution of the objects associated with the attribute value representing the possession of the attribute is weighted toward the connection set in the universal set, the attribute value estimating part 103 estimates the attribute value representing the possession of the attribute as an attribute value associated with an estimation target object.

To be specific, the attribute value estimating part 103 calculates an uneven-distribution degree $b_k$ regarding a $k^{th}$ attribute based on an equation (5) shown below. Herein, it is assumed that universal set internal density regarding the $k^{th}$ attribute is $a_k$ and connection set internal density is $c_k$.

[Equation 5]

$$b_k = \frac{c_k}{a_k} \qquad (5)$$

A specific process executed by the attribute value estimating part 103 at the time of estimation of an attribute value based on the universal set internal density $a_k$ shown in FIG. 7 and the connection set internal density $c_k$ shown in FIG. 10 will be described.

The attribute value estimating part 103 calculates an uneven-distribution degree $b_k$ for each attribute based on the stored universal set internal density $a_k$, the connection set internal density $c_k$ accepted from the connection set internal density calculating part 102, and the above equation (5).

In this exemplary embodiment, the attribute value estimating part 103 calculates an uneven-distribution degree $b_k$ as shown in FIG. 16. That is to say, an uneven-distribution degree $b_k$ regarding an attribute "golf" is "2.5," an uneven-distribution degree $b_k$ regarding an attribute "tennis" is "1.7," an uneven-distribution degree $b_k$ regarding an attribute "lacrosse" is "20," and an uneven-distribution degree $b_k$ regarding an attribute "soccer" is "1.7."

Thus, it appears that a distribution of objects associated with an attribute value representing the possession of the attribute "lacrosse" is weighted toward a connection set composed of connection objects at the highest degree in a universal set.

Then, for each attribute, the attribute value estimating part 103 outputs (estimates) an attribute value representing the possession of the attribute as an attribute value associated with an estimation target object regarding the attribute when the calculated uneven-distribution degree $b_k$ is larger than a threshold uneven-distribution degree and, on the other hand, outputs an attribute value representing the absence of the attribute as an attribute associated with an estimation target object regarding the attribute when the calculated uneven-distribution degree $b_k$ is smaller than a threshold uneven-distribution degree.

Herein, a case that "2" is set as a threshold uneven-distribution degree is simulated. In this case, the attribute value estimating part 103 outputs "1" for "golf" and "lacrosse" and outputs "0" for "tennis" and "soccer," as attribute values associated with the estimation target object "X."

Figures 17, 18:
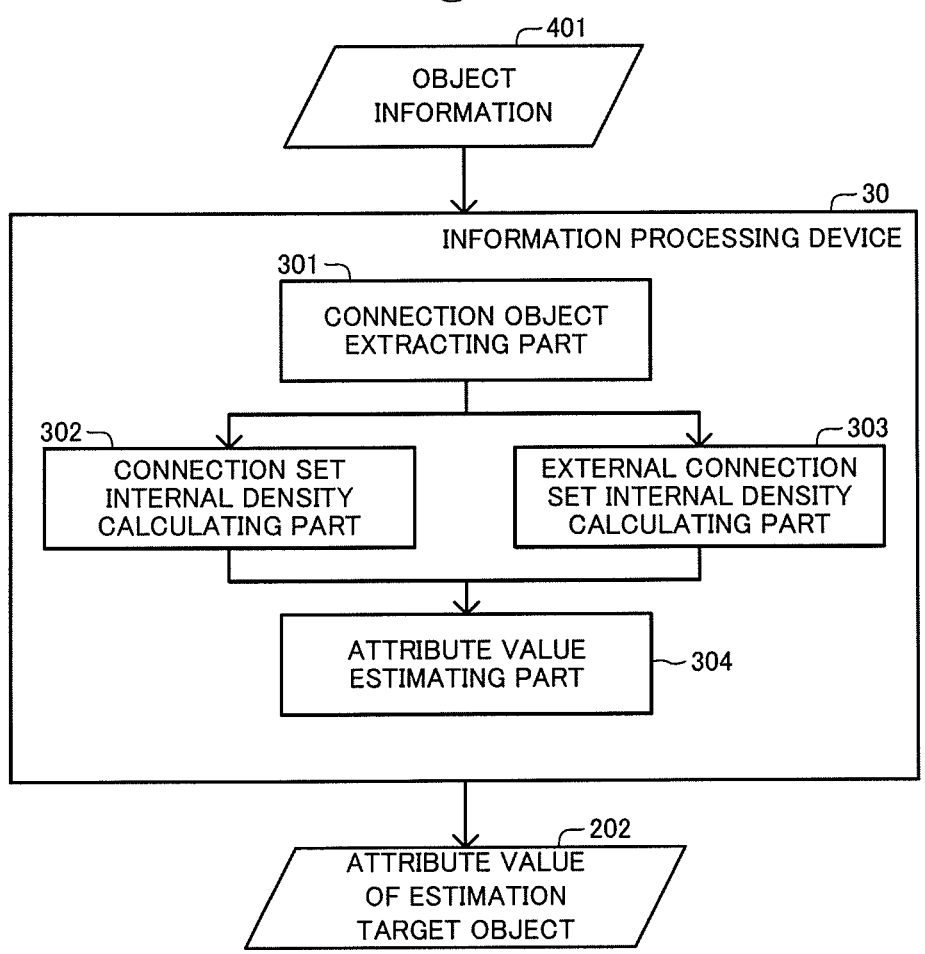
FIG. 17 is a table showing an uneven-distribution degree calculated by an attribute value estimating part according to a modified example of the first exemplary embodiment of the present invention.
FIG. 18 is a block diagram schematically showing a function of an information processing device according to a second exemplary embodiment of the present invention.

Next, a case of estimating an attribute value based on the universal set internal density $a_k$ shown in FIG. 7 and the connection set internal density $c_k$ shown in FIG. 14 will be described. In this case, the attribute value estimating part 103 calculates an uneven-distribution degree $b_k$ as shown in FIG. 17. That is to say, an uneven-distribution degree $b_k$ regarding an attribute "golf" is "2.5," an uneven-distribution degree $b_k$ regarding an attribute "tennis" is "1," an uneven-distribution degree $b_k$ regarding an attribute "lacrosse" is "20" and an uneven-distribution degree $b_k$ regarding an attribute "soccer" is "0.33."

Also in this case, the attribute value estimating part 103 outputs "1" for "golf" and "lacrosse" and outputs "0" for "tennis" and "soccer" as attribute values associated with the estimation target object "X." Moreover, in this case, the uneven-distribution degree $b_k$ regarding "soccer" is smaller than that shown in FIG. 16. This is because "soccer" is an attribute that the number of via-connection objects associated with an attribute value representing the absence of the attribute is relatively large.

The attribute value estimating part 103 may be configured to acquire a maximum value $b_{kmax}$ of the calculated uneven-distribution degrees $b_k$ and, for each attribute, output a value as the result of dividing the uneven-distribution degree $b_k$ by the acquired maximum value $b_{kmax}$, as an attribute value associated with an estimation target object regarding the attribute. In this case, a difference of the uneven-distribution degree $b_k$ between attributes may be extremely large. Thus, the attribute value estimating part 103 may be configured to calculate an attribute value based on a value as the result of taking the logarithm of the calculated uneven-distribution degree $b_k$.

The information processing device 10 stores the attribute value associated with the estimation target object outputted by the attribute value estimating part 103, into the storage device. The information processing device 10 may be configured to output the attribute value associated with the estimation target object outputted by the attribute value estimating part 103 via the output device 16.

A modified example of the attribute value estimating part 103 will be described.

The attribute value estimating part 103 may be configured to perform statistic testing based on universal set internal density $a_k$ and connection set internal density $c_k$ to estimate an attribute value associated with an estimation target object. In this exemplary embodiment, the attribute value estimating part 103 determines for each attribute whether a hypothesis that a predetermined statistic is normally distributed is accepted.

In the case of determining that the hypothesis is rejected when the connection set internal density $c_k$ is larger than the universal set internal density $a_k$, the attribute value estimating part 103 estimates an attribute value representing the possession of the attribute, as an attribute value associated with an estimation target object for the attribute. On the other hand, in the other cases, the attribute value estimating part 103 estimates an attribute value representing the absence of the attribute, as an attribute value associated with an estimation target object for the attribute.

Next, a specific process executed by the attribute value estimating part 103 will be described.

The attribute value estimating part 103 acquires the number Na of objects in a universal set based on the stored profile information. Moreover, the attribute value estimating part 103 acquires the number Nc of objects in a connection set based on connection object ID outputted by the connection object extracting part 101.

Then, the attribute value estimating part 103 calculates a statistic $z_k$ for a $k^{th}$ attribute based on an equation (6) shown below, the stored universal set internal density $a_k$, the connection set internal density $c_k$ accepted from the connection set internal density calculating part 102, the acquired number Na of the objects in the universal set, and the acquired number Nc of the objects in the connection set. A value $d_k$ is a value calculated by an equation (7) shown below.

[Equation 6]

$$z_k = \frac{a_k - c_k}{\sqrt{d_k(1-d_k)\left(\frac{1}{Na} + \frac{1}{Nc}\right)}} \quad (6)$$

[Equation 7]

$$d_k = \frac{a_k Na + c_k Nc}{Na + Nc} \quad (7)$$

It is known that the statistic $z_k$ is normally distributed. Therefore, the attribute value estimating part 103 calculates a significance probability and, when the calculated significance probability is smaller than a preset significance level and the connection set internal density $c_k$ is larger than the universal set internal density $a_k$, estimates an attribute value representing the possession of the attribute as an attribute value associated with an estimation target object regarding the attribute.

As described above, based on an attribute value associated with a connection object which is an object connected with an estimation target subject, the information processing device 10 according to the first exemplary embodiment of the present invention estimates an attribute value associated with the estimation target object.

According to this, it is possible to estimate an attribute value associated with an estimation target object regarding any attribute, even when any object associated with the same attribute value as (or a similar attribute value to) the attribute value associated with the estimation target object does not exist regarding any attribute or any attribute value associated with the estimation target object does not exist. That is to say, according to the information processing device 10, it is possible to inhibit occurrence of a situation that an attribute value associated with an estimation target object cannot be estimated.

Further, in a case that a distribution of objects associated with an attribute value representing the possession of an attribute is weighted toward a connection set in a universal set, the information processing device 10 according to the first exemplary embodiment estimates an attribute value representing the possession of the attribute as an attribute value associated with an estimation target object.

In a case that a distribution of objects having a certain attribute is weighted toward a connection set in a universal set, an estimation target object also has the attribute with high possibility. Therefore, by thus configuring the information processing device 10, it is possible to estimate an attribute value associated with the estimation target object with high accuracy.

Second Exemplary Embodiment

Next, an information processing device according to a second exemplary embodiment of the present invention will be described. The information processing device according to the second exemplary embodiment is different from the information processing device according to the first exemplary embodiment described above in being configured to estimate an attribute value associated with an estimation target object not based on universal set internal density. Therefore, a description will be made focusing on the different point.

In a case that each connection object is the centerpiece of a local set having a certain attribute, an attribute value associated with an estimation target object is an attribute value representing the possession of the attribute with relatively high possibility. Thus, the information processing device according to the second exemplary embodiment analyzes whether each connection object is the centerpiece of a local set having a certain attribute, and estimates an attribute value associated with an estimation target object based on the result of the analysis.

FIG. 18 is a block diagram showing a function of an information processing device 30 according to the second exemplary embodiment. The function of the information processing device 30 includes a connection object extracting part (a connection object extracting means) 301, a connection set internal density calculating part (a connection set internal density calculating means) 302, an external connection set internal density calculating part (an external connection set internal density calculating means) 303, and an attribute value estimating part (an attribute value estimating means) 304.

Figures 19, 20, 21:
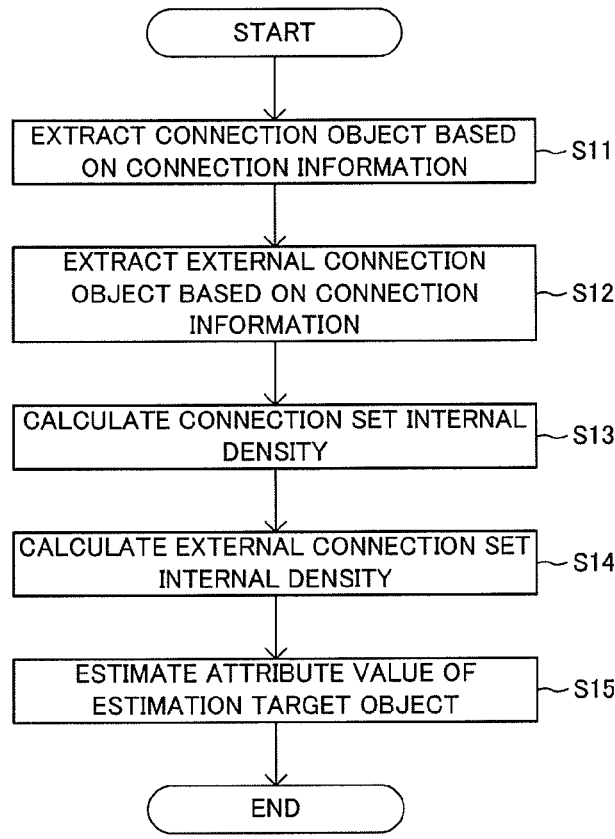
FIG. 19 is a flowchart showing the outline of a process executed by the information processing device according to the second exemplary embodiment of the present invention.
FIG. 20 is a table showing connection object ID and external connection object ID which are stored by the information processing device according to the second exemplary embodiment of the present invention.
FIG. 21 is a table showing connection set internal density calculated by a connection set internal density calculating part according to the second exemplary embodiment of the present invention.

As shown in FIG. 18, object information 401 is data inputted into the information processing device 30, and an attribute value 202 of an estimation target object is data outputted from the information processing device 30. FIG. 19 is a flowchart showing the outline of a process executed by a CPU of the information processing device 30.

Below, with reference to FIGS. 18 and 19, the function of the information processing device 30 will be described.

The object information 401 includes information as the result of excluding universal set internal density from the object information 201 according to the first exemplary embodiment.

(Connection Object Extracting Part)

The connection object extracting part 301 extracts a connection object connected with an estimation target object from among objects in a universal set based on the connection information stored in the storage device, in the same manner as the connection object extracting part 101 according to the first exemplary embodiment. This process corresponds to a process of step S11 in FIG. 19. In this exemplary embodiment, the connection object extracting part 301 extracts an object other than an object whose hop count from an estimation target object is larger than a preset first threshold hop count (in this exemplary embodiment, "1"), as a connection object from among objects connected with the estimation target object.

In a case that two objects being focused are connected via another object (a via-object), a hop count is a value as the result of adding "1" to the number of via-objects in a shortest path to reach one of the two objects from the other. That is to say, a connection set composed of connection objects is configured so that a hop count, which is a value as the result of adding 1 to the number of via-objects in a shortest path to reach an estimation target object in the center of the connection set from any connection object in the connection set, becomes equal to or less than a preset first threshold hop count.

Further, the connection object extracting part 301 extracts an external connection object based on the connection information stored in the storage device and the extracted connection object. Herein, an external connection object is an object other than an estimation target object among objects connected with a connection object. This process corresponds to a process of step S12 in FIG. 19.

In this exemplary embodiment, regarding each of the extracted connection objects, the connection object extracting part 301 excludes an estimation target object among objects connected with the connection object, and extracts an object other than an object whose hop count from the connection object is larger than a preset second threshold hop count (in this exemplary embodiment, "1"), as an external connection object. That is to say, the connection object extracting part 301 extracts an external connection object configuring an external connection set in which each of the extracted connection objects is the center.

It can be said that each external connection set is configured so that a hop count, which is the result of adding 1 to the number of via-objects in a shortest path to reach a connection object in the center of the external connection set from any external connection object in the external connection set, becomes equal to or less than a preset second threshold hop count.

The connection object extracting part 301 preliminarily stores the first threshold hop count and the second threshold hop count. The first threshold hop count and the second threshold hop count may be values inputted via the input device by the administrator of the information processing device 30.

Furthermore, the connection object extracting part 301 outputs information representing the extracted connection object to the connection set internal density calculating part 302, and also outputs information representing the extracted external connection object to the external connection set internal density calculating part 303.

A specific process executed by the connection object extracting part 301 will be described.

Firstly, the connection object extracting part 301 accepts object ID (herein, "X") inputted by the administrator of the information processing device 30, as object ID for identifying an estimation target object. The connection object extracting part 301 may be configured to acquire object ID whose attribute value is not included in the stored profile information and accept the acquired object ID as object ID for identifying an estimation target object.

The connection object extracting part 301 acquires connection object ID ("A," "B," "C" and "D") associated with the object ID "X" included in the connection information stored as shown in FIG. 4. Objects identified by the acquired connection object ID "A," "B," "C" and "D" are objects (i.e., connection objects) connected by a hop count "1" (i.e., connected directly) with the estimation target object ("X"). Next, the connection object extracting part 301 stores the acquired connection object ID ("A," "B," "C" and "D") into the storage device.

Then, for each of the acquired connection object ID ("A," "B," "C" and "D"), the connection object extracting part 301 acquires connection object ID associated with the object ID, included in the stored connection information. Next, the connection object extracting part 301 acquires connection object ID other than the object ID "X" from the acquired connection object ID, as external connection object ID. An object identified by the acquired external connection object ID is an object (i.e., an external connection object) connected by a hop count "1" (i.e., connected directly) with a connection object identified by the connection object ID that is the basis of acquisition of the external connection object ID.

For example, the connection object extracting part 301 acquires external connection object ID "B," "E" and "J" for the connection object ID "A." Likewise, the connection object extracting part 301 acquires external connection object ID "A" for the connection object ID "B."

The connection object extracting part 301 stores the acquired external connection object ID into the storage device in association with the connection ID that is the basis of the acquisition of the external connection object ID.

Then, the connection object extracting part 301 outputs the stored connection object ID to the connection set internal density calculating part 302. Moreover, the connection object extracting part 301 outputs the stored external connection object ID to the external connection set internal density calculating part 303, in association with the connection object ID stored in association with the external connection object ID.

In this exemplary embodiment, the connection object extracting part 301 stores connection object ID and external connection object ID in association with each other as shown in FIG. 20. In a case that the second threshold hop count is set to 2 or more, it is preferred that the connection object extracting part 301 stores connection object ID, external connection object ID and a hop count in association with each other into the storage device and outputs the connection object ID, the external connection object ID and the hop count in association with each other to the external connection set internal density calculating part 303.

(Connection Set Internal Density Calculating Part)

The connection set internal density calculating part 302 accepts connection object ID outputted by the connection object extracting part 301. The connection set internal density calculating part 302 calculates connection set internal density for each attribute based on the accepted connection object ID. A process executed by the connection set internal density calculating part 302 corresponds to a process of step S13 in FIG. 19.

The connection set internal density calculating part 302 has the same function as the connection set internal density calculating part 102 according to the first exemplary embodiment. Therefore, a detailed description thereof will be omitted herein. Connection set internal density $c_k$ for a $k^{th}$ attribute is a real number equal to or more than 0 and equal to or less than 1.

Then, the connection set internal density calculating part 302 outputs the calculated connection set internal density $c_k$ to the attribute value estimating part 304.

(External Connection Set Internal Density Calculating Part)

The external connection set internal density calculating part 303 accepts connection object ID and external connection object ID that are outputted by the connection object extracting part 301. The external connection set internal density calculating part 303 calculates external connection set internal density for each attribute based on the accepted connection object ID and external connection object ID. A process executed by the external connection set internal density calculating part 303 corresponds to a process of step S14 in FIG. 19. The information processing device 30 may execute the process of step S13 and the process of step S14 at the same time, or in reverse order.

External connection set internal density is a value as the result of quantifying whether each connection object for an estimation target object is the centerpiece of a set of objects having a certain attribute. In a case that a connection object is the centerpiece of a local set having a certain attribute, an attribute value associated with an estimation target object is an attribute value representing the possession of the attribute with relatively high possibility.

The external connection set internal density calculating part 303 calculates external connection set internal density for each attribute, regarding an external connection set in which each connection object is the center. To be specific, regarding each external connection set, the external connection set internal density calculating part 303 calculates a value as the result of dividing the number of objects associated with an attribute value representing the possession of an attribute among objects (external connection objects) in the external connection set by the number (the total number) of the objects in the external connection set, as external connection set internal density $e_{ik}$.

The external connection set internal density $e_{ik}$, which is a value for an external connection set in which an $i^{th}$ connection object is the center and is a value for a $k^{th}$ attribute, is a real number equal to or more than 0 and equal to or less than 1. In this exemplary embodiment, the external connection set internal density calculating part 303 calculates the external connection set internal density $e_{ik}$ in the same manner as when the connection set internal density calculating part 302 calculates the connection set internal density $c_k$.

Then, the external connection set internal density calculating part 303 determines a typical value $e_k$ of the calculated external connection set internal density $e_{ik}$ for each attribute. Then, the external connection set internal density calculating part 303 outputs the determined typical value $e_k$ to the attribute value estimating part 304. That is to say, the typical value $e_k$ of the external connection set internal density is a vector having the same dimension as the connection set internal density $c_k$.

A specific process executed by the external connection set internal density calculating part 303 will be described by taking a case of accepting connection object ID and external connection object ID associated with each other as shown in FIG. 20 as an example.

The external connection set internal density calculating part 303 executes processes described below in order, for each of the accepted connection object ID.

The external connection set internal density calculating part 303 firstly acquires external connection object ID associated with connection object ID. The external connection set internal density calculating part 303 acquires external connection object ID "B," "E" and "J" regarding connection object ID "A."

The external connection set internal density calculating part 303 counts the acquired external connection object ID to acquire the total number of external connection objects. In this exemplary embodiment, the external connection set internal density calculating part 303 acquires the external connection object ID "B," "E" and "J," so that the total number of the acquired external connection objects is "3."

Next, the external connection set internal density calculating part 303 acquires an attribute value associated with connection object ID and an attribute value associated with each external connection object ID based on the stored profile information. That is to say, the external connection set internal density calculating part 303 acquires an attribute value associated with each of object ID "A," "B," "E" and "J."

Then, the external connection set internal density calculating part 303 calculates "0" as external connection set internal density $e_{ik}$ in a case that an attribute value of a $k^{th}$ attribute among the attribute values acquired regarding the object ID "A" represents the absence of the attribute.

On the other hand, in a case that an attribute value of a $k^{th}$ attribute among the attribute values acquired regarding the object ID "A" represents the possession of the attribute, the external connection set internal density calculating part 303 calculates external connection set internal density $e_{ik}$ based on the same equation as the equation (1), the acquired attribute value, and the acquired total number of external connection objects.

In this exemplary embodiment, the external connection set internal density $e_{ik}$ calculated for an external connection set in which a connection object "A" is the center and calculated for an attribute "golf" and an attribute "tennis" have values larger than "0." Moreover, the external connection set internal density $e_{ik}$ calculated for the external connection set in which the connection object "A" is the center and calculated for an attribute "soccer" and an attribute "lacrosse" are "0."

Then, the external connection set internal density calculating part 303 stores the calculated external connection set internal density $e_{ik}$ into the storage device.

The external connection set internal density calculating part 303 also executes the same process as the process on the connection object ID "A" mentioned above, on each of the connection object ID "B," "C" and "D."

Next, the external connection set internal density calculating part 303 determines a typical value $e_k$ of the external connection set internal density $e_{ik}$, based on the external connection set internal density $e_{ik}$ calculated (i.e., stored) for each external connection set.

In this exemplary embodiment, the maximum value of the external connection set internal density $e_{ik}$ calculated regarding the $k^{th}$ attribute, as a typical value $e_k$ for a $k^{th}$ attribute. The external connection set internal density calculating part 303 may determine an average value of the external connection set internal density $e_{ik}$ calculated regarding a $k^{th}$ attribute, as the typical value $e_k$ regarding the $k^{th}$ attribute.

Then, the external connection set internal density calculating part 303 outputs the determined typical value $e_k$ to the attribute value estimating part 304.

(Attribute Value Estimating Part)

The attribute value estimating part 304 accepts connection set internal density $c_k$ outputted from the connection set internal density calculating part 302 and a typical value $e_k$ of external connection set internal density outputted from the external connection set internal density calculating part 303. The attribute value estimating part 304 estimates an attribute value associated with an estimation target value for each attribute, based on the accepted connection set internal density $c_k$ and external connection set internal density $e_k$. A process executed by the attribute value estimating part 304 corresponds to a process of FIG. 15 in FIG. 19.

As connection set internal density regarding a certain attribute becomes higher (larger), an estimation target object has the attribute with higher possibility. Moreover, as external connection set internal density of a certain attribute becomes higher, an estimation target object has the attribute with higher possibility.

Thus, in this exemplary embodiment, the attribute value estimating part 304 determines whether the value of connection set internal density $c_k$ is larger than preset first threshold density α1 for each attribute. In the case of determining that the value of the connection set internal density $c_k$ is larger than the first threshold density α1, the attribute value estimating part 304 estimates an attribute value representing the possession of the attribute, as an attribute value associated with an estimation target object regarding the attribute. The first threshold density α1 may be a value inputted by the administrator of the information processing device 30.

On the other hand, in the case of determining that the value of the connection set internal density $c_k$ is equal to or less than the first threshold density α1, the attribute value estimating part 304 determines whether the value of the connection set internal density $c_k$ is larger than preset third threshold density α3. The third threshold density α3 is a value smaller than the first threshold density α1. The third threshold density α3 may be a value inputted by the administrator of the information processing device 30.

In the case of determining that the value of the connection set internal density $c_k$ is larger than the third threshold density α3, the attribute value estimating part 304 determines whether a typical value $e_k$ of external connection set internal density is larger than preset second threshold density α2. The second threshold density α2 may be a value inputted by the administrator of the information processing device 30. Moreover, the first threshold density α1 and the second threshold density α2 may be the same value.

In a case that the value of the connection set internal density $c_k$ is equal to or less than the first threshold density α1, the value of the connection set internal density $c_k$ is larger than the third threshold density α3, and the typical value $e_k$ of the external connection set internal density is larger than the preset second threshold density α2, the attribute value estimating part 304 estimates an attribute value representing the possession of the attribute as an attribute value associated with an estimation target object regarding each connection set.

In the case of determining that the value of the connection set internal density $c_k$ is equal to or less than the third threshold density α3, the attribute value estimating part 304 estimates an attribute value representing the absence of the attribute, as an attribute value associated with an estimation target object regarding the attribute.

Likewise, in the case of determining that the value of the connection set internal density $c_k$ is equal to or less than the first threshold density α1, the value of the connection set internal density $c_k$ is larger than the third threshold density α3, and the typical value $e_k$ of the external connection set internal density is equal to or less than the second threshold density α2, the attribute value estimating part 304 estimates an attribute value representing the absence of the attribute as an attribute value associated with an estimation target object regarding the attribute.

Figures 22, 23:
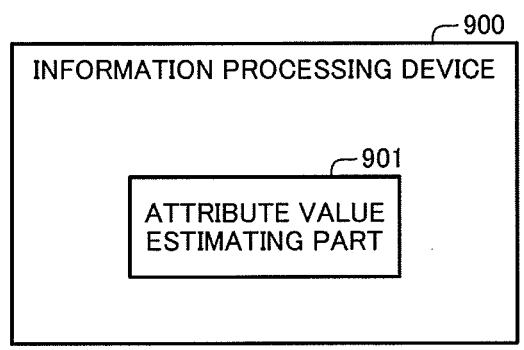
FIG. 22 is a table showing a typical value of external connection set internal density calculated by an external connection set internal density calculating part according to the second exemplary embodiment of the present invention.
FIG. 23 is a block diagram schematically showing a function of an information processing device according to a third exemplary embodiment of the present invention.

Next, a specific process by the attribute value estimating part 304 when estimating an attribute value based on connection set internal density shown in FIG. 21 and typical values of external connection set internal density shown in FIG. 22 will be described. It is assumed that both the first threshold density α1 and the second threshold density α2 are set to "0.5" and the third threshold density α3 is set to "0.3."

In this exemplary embodiment, α value "0.1" of the connection set internal density $c_k$ regarding the attribute "golf" is equal to or less than the third threshold density α3. Therefore, the attribute value estimating part 304 estimates (outputs) "0" (i.e., an attribute value representing the absence of the attribute) for the attribute "golf" as an attribute value associated with the estimation target object "X."

Further, a value "0.6" of the connection set internal density $c_k$ regarding the attribute "tennis" is larger than the first threshold density α1. Therefore, the attribute value estimating part 304 estimates (outputs) "1" (i.e., an attribute value representing the possession of an attribute) for the attribute "tennis" as an attribute value associated with the estimation target object "X."

Further, a value "0.4" of the connection set internal density $c_k$ regarding the attribute "lacrosse" is equal to or less than the first threshold density α1 and larger than the third threshold density α3. Moreover, the typical value $e_k$ "0.6" of the external connection set internal density regarding the attribute "lacrosse" is larger than the second threshold density α2. Therefore, the attribute value estimating part 304 estimates (outputs) "1" for the attribute "lacrosse" as an attribute value associated with the estimation target object "X."

Further, a value "0.4" of the connection set internal density $c_k$ regarding the attribute "soccer" is equal to or less than the first threshold density α1 and larger than the third threshold density α3. Moreover, the typical value $e_k$ "0.4" of the external connection set internal density regarding the attribute "soccer" is equal to or less than the second threshold density α2. Therefore, the attribute value estimating part 304 estimates (outputs) "0" for the attribute "soccer" as an attribute value associated with the estimation target object "X."

As described above, the information processing device 30 according to the second exemplary embodiment of the present invention estimates an attribute value associated with an estimation target object, based on an attribute value associated with a connection object which is an object connected with the estimation target object.

According to this, even when, any object associated with the same attribute value as (or a similar attribute value to) an attribute value associated with an estimation target object does not exist regarding any attribute or any attribute value associated with the estimation target object does not exist, it is possible to estimate an attribute value associated with the estimation target object. That is to say, according to the information processing device 30, it is possible to inhibit occurrence of a situation that an attribute value associated with an estimation target object cannot be estimated.

Further, the information processing device 30 is configured to, in a case that connection set internal density $c_k$ is larger than first threshold density α1 regarding a $k^{th}$ attribute, estimate an attribute value representing the possession of the attribute as an attribute value associated with an estimation target object.

In a case that connection set internal density $c_k$ is sufficiently large, an estimation target object often has an attribute. Therefore, by thus configuring the information processing device 30, it is possible to estimate an attribute value associated with an estimation target object with high accuracy.

In addition, the information processing device 30 is configured to, in a case that connection set internal density $c_k$ is smaller than first threshold density α1 regarding a $k^{th}$ attribute and a typical value $e_k$ is larger than second threshold density α2, estimate an attribute value representing the possession of the attribute as an attribute value associated with an estimation target object.

When the connection set internal density $c_k$ is relatively small but the typical value $e_k$ of the external connection set internal density is relatively large, the estimation target object often has the attribute. Therefore, by thus configuring the information processing device 30, it is possible to estimate an attribute value associated with an estimation target object with high accuracy.

In a modified example of the second exemplary embodiment, in a case that the connection set internal density $c_k$ is equal to or less than the third threshold density α3 but the typical value $e_k$ of the external connection set internal density is larger than the second threshold density α2, the information processing device 30 may estimate an attribute value representing the possession of the attribute as the attribute value associated with the estimation target object regarding the attribute. That is to say, the information processing device 30 may estimate the attribute value associated with the estimation target object not based on the third threshold density α3.

Further, in another modified example of the second exemplary embodiment, the information processing device 30 may estimate the attribute value associated with the estimation target object based on only the connection set internal density $c_k$, not based on external connection set internal density $e_{ik}$.

That is to say, in this case, the information processing device 30 is configured to estimate the attribute value representing the possession of the attribute as the attribute value associated with the estimation target object when the connection set internal density $c_k$ is larger than the first threshold density α1, whereas estimate an attribute value representing the absence of the attribute as the attribute value associated with the estimation target object when the connection set internal density $c_k$ is equal to or less than the first threshold density α1.

Third Exemplary Embodiment

Next, an information processing device according to a third exemplary embodiment of the present invention will be described with reference to FIG. 23.

An information processing device 900 according to the third exemplary embodiment comprising an attribute value estimating part 901 (attribute value estimating means) for, based on an attribute value associated with a connection object that is an object connected with an estimation target object that is one object in a universal set including a plurality of objects each associated with an attribute value that is a value representing possession or absence of an attribute, estimating an attribute value associated with the estimation target object.

According to this, even when any object associated with the same attribute value as (or a similar attribute value to) an attribute value associated with an estimation target object does not exist regarding any attribute or any attribute value associated with an estimation target object does not exist, it is possible to estimate an attribute value associated with an estimation target object. That is to say, according to the information processing device 900, it is possible to inhibit occurrence of a situation that an attribute value associated with an estimation target object cannot be estimated.

Although the present invention has been described above with reference to the exemplary embodiments, the present invention is not limited to the exemplary embodiments described above. It is possible to change in various manners that can be understood by those skilled in the art within the scope of the present invention.

For example, each of the functions of the information processing device 10 in the exemplary embodiments described above is realized by execution of a program (software) by the CPU, but may be realized by hardware such as a circuit.

Further, the program is stored in the storage device in each of the exemplary embodiments, but may be stored in a computer-readable storage medium. For example, the recording medium is a portable medium such as a flexible disk, an optical disk, a magneto-optical disk and a semiconductor memory.

Further, as another modified example of each of the exemplary embodiments described above, any combination of the exemplary embodiments and modified examples described above may be employed.

<Supplementary Notes>

The whole or part of the exemplary embodiments disclosed above can be described as, but not limited to, the following supplementary notes.

(Supplementary Note 1)

An information processing device, comprising an attribute value estimating means for, based on an attribute value associated with a connection object that is an object connected with an estimation target object that is one object in a universal set including a plurality of objects each associated with an attribute value that is a value representing possession or absence of an attribute, estimating an attribute value associated with the estimation target object.

According to this, even when any object associated with the same attribute value as (or a similar attribute value to) an attribute value associated with an estimation target object does not exist regarding any attribute or any attribute value associated with an estimation target object does not exist, it is possible to estimate an attribute value associated with an estimation target object. That is to say, according to the information processing device 900, it is possible to inhibit occurrence of a situation that an attribute value associated with an estimation target object cannot be estimated.

(Supplementary Note 2)

The information processing device according to Supplementary Note 1, wherein the attribute value estimating means is configured to, in a case that a distribution of objects associated with an attribute value representing the possession of the attribute is weighted toward a connection set composed of the connection objects in the universal set, estimate the attribute value representing the possession of the attribute as the attribute value associated with the estimation target object.

In a case that a distribution of objects having a certain attribute is weighted toward a connection set composed of connection objects in a universal set, an estimation target object often has the attribute. Therefore, by configuring the information processing device as described above, it is possible to estimate an attribute value associated with an estimation target object with high accuracy.

(Supplementary Note 3)

The information processing device according to Supplementary Note 2, wherein the attribute value estimating means is configured to, based on universal set internal density having a value becoming larger as a ratio of a number of objects associated with the attribute value representing the possession of the attribute among the objects in the universal set to a number of the objects in the universal set becomes larger, and based on connection set internal density having a value becoming larger as a ratio of a number of the objects associated with the attribute value representing the possession of the attribute among the objects in the connection set to a number of the objects in the connection set becomes larger, determine whether the distribution of the objects associated with the attribute value representing the possession of the attribute is weighted toward the connection set in the universal set.

(Supplementary Note 4)

The information processing device according to Supplementary Note 3, wherein the attribute value is a value becoming larger as strength of a degree that the object has the attribute becomes more, the information processing device, comprising a connection set internal density calculating means for calculating a value which becomes larger as a sum of the attribute values associated with the objects in the connection set becomes larger and which becomes smaller as a total number of the objects in the connection set becomes larger, as the connection set internal density.

For example, in a case that an object is a user and an attribute is a hobby of a user, the strength of a degree that an object has an attribute corresponds to the level of an interest in the hobby of the user. Moreover, in a case that an object is a document and an attribute is a keyword, the strength of a degree that an object has an attribute corresponds to the frequency of appearance of the keyword in the document.

Accordingly, by configuring the information processing device as described above, it is possible to properly determine depending on the strength of a degree that an object has an attribute whether a distribution of objects associated with an attribute value representing the possession of the attribute is weighted toward a connection set in a universal set.

(Supplementary Note 5)

The information processing device according to Supplementary Note 4, wherein the connection set internal density calculating means is configured to correct the connection set internal density to a smaller value as a number of connection objects which are connected with the estimation target object via a connection object associated with an attribute value representing the absence of the attribute and which are associated with the attribute value representing the possession of the attribute becomes larger.

There is a case that a connection object associated with an attribute value representing the possession of an attribute and an estimation target object are connected with each other via another connection object, i.e., a via-connection object (through another connection object). In this case, there are cases that the via-connection object is associated with the attribute value representing the possession of the attribute (a first case), and that the via-connection object is associated with an attribute value representing the absence of the attribute (a second case).

In the first case, the estimation target object has the attribute with higher possibility than in the second case. Therefore, by configuring the information processing device as described above, it is possible to estimate an attribute value associated with an estimation target object with higher accuracy.

(Supplementary Note 6)

The information processing device according to Supplementary Note 4 or 5, wherein the connection set internal density calculating means is configured to correct the connection set internal density to a smaller value as strength of a connection between the estimation target object and the connection object becomes weaker.

For example, in a case that an object is a user, the strength of a connection between an estimation target object and a connection object corresponds to the frequency of transmission and reception of information between users, the possibility that information is transmitted and received between users, or the like. Moreover, in a case that an object is a document, the strength of a connection between an estimation target object and a connection object corresponds to the frequency that the document refers to another document, or the like.

Further, when an estimation target object and a connection object are connected via another connection object (a via-connection object), the strength of a connection between the estimation target object and the connection object becomes weaker as the number of via-connection objects becomes larger.

Accordingly, by configuring the information processing device as described above, it is possible to properly determine depending on the strength of a connection between an estimation target object and a connection object whether a distribution of objects associated with an attribute value representing the possession of the attribute is weighted toward a connection set in a universal set.

(Supplementary Note 7)

The information processing device according to any of Supplementary Notes 3 to 6, comprising a connection object extracting means for extracting the connection object that is the object connected with the estimation target object from among the objects in the universal set, wherein:

the attribute value estimating means is configured to, based on an attribute value associated with the extracted connection object, estimate the attribute value associated with the estimation target object; and the connection object extracting means is configured to extract a smaller number of the connection objects as the universal set internal density becomes smaller.

In a case that universal set internal density regarding a certain attribute is relatively small, the number of objects having the attribute is relatively small with high possibility. Therefore, in such a case, if an extremely large number of connection objects are extracted, it is impossible to properly determine whether a distribution of objects associated with an attribute value representing the possession of the attribute is weighted toward a connection set in a universal set. Accordingly, by configuring the information processing device as described above, it is possible to properly determine whether a distribution of objects associated with the attribute value representing the possession of the attribute is weighted toward a connection set in a universal set.

(Supplementary Note 8)

The information processing device according to Supplementary Note 1, wherein the attribute value estimating means is configured to, in a case that connection set internal density, which has a value becoming larger as a ratio of a number of objects associated with an attribute value representing the possession of the attribute among objects in a connection set composed of the connection objects to a number of the objects in the connection set becomes larger, is larger than preset first threshold density, estimate the attribute value representing the possession of the attribute as the attribute value associated with the estimation target object.

In a case that connection set internal density is sufficiently large, an estimation target object often has the attribute. Therefore, by configuring the information processing device as described above, it is possible to estimate an attribute value associated with an estimation target object with high accuracy.

(Supplementary Note 9)

The information processing device according to Supplementary Note 8, wherein the attribute value estimating means is configured to estimate the attribute value associated with the estimation target object, based on external connection set internal density having a value becoming larger as a ratio of a number of the objects associated with the attribute value representing the possession of the attribute among objects in an external connection set composed of external connection objects that are objects connected with the connection object to a number of the objects in the external connection set becomes larger, and based on the connection set internal density.

When external connection set internal density is relatively large, the estimation target object usually has the attribute. Therefore, by configuring the information processing device as described above, it is possible to estimate an attribute value associated with the estimation target object with high accuracy.

(Supplementary Note 10)

The information processing device according to Supplementary Note 9, wherein the attribute value estimating means is configured to:

for each of the connection objects, calculate the external connection set internal density regarding the external connection set including the connection object as a center;

based on the external connection set internal density calculated for the respective connection objects, determine a typical value of the external connection set internal density; and estimate the attribute value associated with the estimation target object based on the determined typical value and the connection set internal density.

(Supplementary Note 11)

The information processing device according to Supplementary Note 10, wherein the attribute value estimating means is configured to, in a case that the connection set internal density is smaller than the first threshold density, when the typical value is larger than preset second threshold density, estimate the attribute value representing the possession of the attribute as the attribute value associated with the estimation target object.

In a case that connection set internal density is relatively small but external connection set internal density is relatively large, an estimation target object often has the attribute. Therefore, by configuring the information processing device described above, it is possible to estimate an attribute value associated with the estimation target object with high accuracy.

(Supplementary Note 12)

The information processing device according to Supplementary Note 10, wherein the attribute value estimating means is configured to, in a case that the connection set internal density is smaller than the first threshold density and is larger than third threshold density smaller than the first threshold density, when the typical value is larger than preset second threshold density, estimate the attribute value representing the possession of the attribute as the attribute value associated with the estimation target object.

In a case that connection set internal density is relatively small but external connection set internal density is relatively large, an estimation target object often has the attribute. Therefore, by configuring the information processing device as described above, it is possible to estimate an attribute value associated with the estimation target object with high accuracy.

(Supplementary Note 13)

The information processing device according to any of Supplementary Notes 9 to 12, wherein:

the connection set is configured so that a hop count, which is a value as a result of adding 1 to a number of via-objects that are in a shortest path to reach the estimation target object as a center of the connection set from any connection object in the connection set and are interposed between the estimation target object and the connection object, becomes equal to or less than a preset first threshold hop count; and the external connection set is configured so that a hop count, which is a value as a result of adding 1 to a number of via-objects that are in a shortest path to reach the connection object as the center of the external connection set from any external connection object in the external connection set and are interposed between the connection object and the external connection object, becomes equal to or less than a preset second threshold hop count.

(Supplementary Note 14)

The information processing device according to any of Supplementary Notes 8 to 13, wherein the attribute value is a value becoming larger as strength of a degree that the object has the attribute becomes more, the information processing device, comprising a connection set internal density calculating means for calculating a value which becomes larger as a sum of the attribute values associated with the objects in the connection set becomes larger and which becomes smaller as a total number of the objects in the connection set becomes larger, as the connection set internal density.

According to this, it is possible to properly calculate connection set internal density depending on the strength of a degree that an object has an attribute. As a result, it is possible to estimate an attribute value associated with an estimation target object with high accuracy.

(Supplementary Note 15)

The information processing device according to Supplementary Note 14, wherein the connection set internal density calculating means is configured to correct the connection set internal density to a smaller value as a number of connection objects which are connected with the estimation target object via a connection object associated with an attribute value representing the absence of the attribute and which are associated with the attribute value representing the possession of the attribute becomes larger.

According to this, it is possible to estimate an attribute value associated with an estimation target object with high accuracy.

(Supplementary Note 16)

The information processing device according to Supplementary Note 14 or 15, wherein the connection set internal density calculating means is configured to correct the connection set internal density to a smaller value as strength of a connection between the estimation target object and the connection object becomes weaker.

According to this, it is possible to properly calculate connection set internal density depending on the strength of a connection between an estimation target object and a connection object. As a result, it is possible to estimate an attribute value associated with the estimation target object with high accuracy.

(Supplementary Note 17)

An information processing method, comprising, based on an attribute value associated with a connection object that is an object connected with an estimation target object that is one object in a universal set including a plurality of objects each associated with an attribute value that is a value representing possession or absence of an attribute, estimating an attribute value associated with the estimation target object.

(Supplementary Note 18)

The information processing method according to Supplementary Note 17, comprising, in a case that a distribution of objects associated with an attribute value representing the possession of the attribute is weighted toward a connection set composed of the connection objects in the universal set, estimating the attribute value representing the possession of the attribute as the attribute value associated with the estimation target object.

(Supplementary Note 19)

The information processing method according to Supplementary Note 17, comprising, in a case that connection set internal density having a value becoming larger as a ratio of a number of objects associated with an attribute value representing the possession of the attribute among objects in a connection set composed of the connection objects to a number of the objects in the connection set becomes larger is larger than preset first threshold density, estimating the attribute value representing the possession of the attribute as the attribute value associated with the estimation target object.

(Supplementary Note 20)

A computer program comprising instructions for causing an information processing device to realize an attribute value estimating means for, based on an attribute value associated with a connection object that is an object connected with an estimation target object that is one object in a universal set including a plurality of objects each associated with an attribute value that is a value representing possession or absence of an attribute, estimating an attribute value associated with the estimation target object.

(Supplementary Note 21)

The computer program according to Supplementary Note 20, wherein the attribute value estimating means is configured to, in a case that a distribution of objects associated with an attribute value representing the possession of the attribute is weighted toward a connection set composed of the connection objects in the universal set, estimate the attribute value representing the possession of the attribute as the attribute value associated with the estimation target object.

(Supplementary Note 22)

The computer program according to Supplementary Note 20, wherein the attribute value estimating means is configured to, in a case that connection set internal density having a value becoming larger as a ratio of a number of objects associated with an attribute value representing the possession of the attribute among objects in a connection set composed of the connection objects to a number of the objects in the connection set becomes larger is larger than preset first threshold density, estimate the attribute value representing the possession of the attribute as the attribute value associated with the estimation target object.

The present invention is based upon and claims the benefit of priority from Japanese patent application No. 2009-264760, filed on Nov. 20, 2009 and Japanese patent application No. 2010-024035, filed on Feb. 5, 2010, the disclosures of which are incorporated herein in its entirety by reference.

INDUSTRIAL APPLICABILITY

The present invention can be applied to, for example, an information processing device configured to estimate an attribute value associated with an object.

DESCRIPTION OF REFERENCE NUMERALS

10 information processing device
11 CPU
12 memory
13 HDD
14 communication IF
15 input device
16 output device
17 bus
101 connection object extracting part
102 connection set internal density calculating part
103 attribute value estimating part
30 information processing device
301 connection object extracting part
302 connection set internal density calculating part
303 external connection set internal density calculating part
304 attribute value estimating part
900 information processing device
901 attribute value estimating part

The invention claimed is:

1. An information processing device comprising:
   a hardware processor; and
   an attribute value estimating unit, implemented on the hardware processor, for estimating an attribute value associated with an estimation target object, based on an attribute value associated with a connection object;
   wherein
   the attribute value is a value representing possession or absence of an attribute,
   the estimation target object is one object in a universal set including a plurality of objects each associated with an attribute value, and the connection object is an object connected with the estimation target object among the objects in the universal set, the information processing device further comprising the attribute value estimating unit for:
estimating an attribute value representing the possession of the attribute as the attribute value associated with the estimation target object, in a case that objects associated with the attribute value representing the possession of the attribute are concentratedly located in a connection set composed of the connection objects in the universal set; and
determining whether the objects associated with the attribute value representing the possession of the attribute are concentratedly located in the connection set in the universal set, based on an internal density of the universal set and an internal density of the connection set, wherein
the internal density of the universal set has a value that becomes larger as a ratio of a number of objects associated with the attribute value representing the possession of the attribute among the objects in the universal set, to a number of the objects in the universal set, becomes larger, and
the internal density of the connection set has a value that becomes larger as a ratio of a number of the objects associated with the attribute value representing the possession of the attribute among the objects in the connection set, to a number of the objects in the connection set, becomes larger.

2. The information processing device according to claim 1, wherein the attribute value is a value that becomes larger as strength of a degree that the object has the attribute increases, and
the information processing device further comprises a connection set internal density calculating unit, implemented on the hardware processor, for calculating a value, which becomes larger as a sum of the attribute values associated with the objects in the connection set becomes larger and which becomes smaller as a total number of the objects in the connection set becomes larger, as the internal density of the connection set.

3. The information processing device according to claim 2, wherein the connection set internal density calculating unit is configured to correct the internal density of the connection set to a smaller value as a number of connection objects, which are connected with the estimation target object via a connection object associated with an attribute value representing the absence of the attribute and which are associated with the attribute value representing the possession of the attribute, becomes larger.

4. The information processing device according to claim 2, wherein the connection set internal density calculating unit is configured to correct the internal density of the connection set to a smaller value as strength of a connection between the estimation target object and the connection object becomes weaker.

5. The information processing device according to claim 1, further comprising a connection object extracting unit, implemented on the hardware processor, for extracting the connection object, wherein
the connection object extracting unit is configured to extract a smaller number of the connection objects as the internal density of the universal set becomes smaller.

6. An information processing device comprising:
a hardware processor; and
an attribute value estimating unit, implemented on the hardware processor, for estimating an attribute value associated with an estimation target object, based on an attribute value associated with a connection object; wherein,
the attribute value is a value representing possession or absence of an attribute,
the estimation target object is one object in a universal set including a plurality of objects each associated with an attribute value, and
the connection object is an object connected with the estimation target object among the object in the universal set,
the information processing device further comprising the attribute value estimating unit for estimating an attribute value representing the possession of the attribute as the attribute value associated with the estimation target object, in a case that objects associated with the attribute value representing the possession of the attribute are concentratedly located in a connection set composed of the connection objects in the universal set such that an internal density of the connection set is larger than a preset first threshold density,
wherein the internal density of the connection set becomes larger as a ratio of a number of objects associated with the attribute value representing the possession of the attribute among objects in the connection set, to a number of the objects in the connection set becomes larger.

7. The information processing device according to claim 6, wherein the attribute value estimating unit is configured to estimate the attribute value associated with the estimation target object, based on an internal density of an external connection set composed of external connection objects that are objects connected with the connection object and the internal density of the connection set, and
wherein the internal density of the external connection set has a value that becomes larger as a ratio of a number of the objects associated with the attribute value representing the possession of the attribute among objects in the external connection set, to a number of the objects in the external connection set, becomes larger.

8. The information processing device according to claim 7, wherein the attribute value estimating unit is configured to:
for each of the connection objects, calculate the internal density of the external connection set regarding the external connection set including the connection object as a center,
based on the internal density of the external connection set calculated for the respective connection objects, determine a typical value of the internal density of the external connection set, and
estimate the attribute value associated with the estimation target object based on the determined typical value and the internal density of the connection set.

9. The information processing device according to claim 8, wherein the attribute value estimating unit is further configured to, in a case that the internal density of the connection set is smaller than the first threshold density, when the typical value is larger than a preset second threshold density, estimate the attribute value representing the possession of the attribute as the attribute value associated with the estimation target object.

10. The information processing device according to claim 8, wherein the attribute value estimating unit is further configured to, in a case that the internal density of the connection set is smaller than the first threshold density and is larger than a third threshold density smaller than the first threshold density, when the typical value is larger than a preset second threshold density, estimate the attribute value representing the possession of the attribute as the attribute value associated with the estimation target object.

11. The information processing device according to claim 7, wherein:
the connection set is configured so that a hop count, which is a value generated as a result of adding 1 to a number of via-objects that are in a shortest path to reach the estimation target object as a center of the connection set from any connection object in the connection set and are interposed between the estimation target object and the connection object, becomes equal to or less than a preset first threshold hop count, and
the external connection set is configured so that a hop count, which is a value generated as a result of adding 1 to a number of via-objects that are in a shortest path to reach the connection object as the center of the external connection set from any external connection object in the external connection set and are interposed between the connection object and the external connection object, becomes equal to or less than a preset second threshold hop count.

12. The information processing device according to claim 6, wherein the attribute value is a value that becomes larger as strength of a degree that the object has the attribute increases, and
the information processing device further comprises a connection set internal density calculating unit, implemented on the hardware processor, for calculating a value which becomes larger as a sum of the attribute values associated with the objects in the connection set becomes larger and which becomes smaller as a total number of the objects in the connection set becomes larger, as the internal density of the connection set.

13. The information processing device according to claim 12, wherein the connection set internal density calculating unit is configured to correct the internal density of the connection set to a smaller value as a number of connection objects, which are connected with the estimation target object via a connection object associated with an attribute value representing the absence of the attribute and which are associated with the attribute value representing the possession of the attribute, becomes larger.

14. The information processing device according to claim 12, wherein the connection set internal density calculating unit is configured to correct the internal density of the connection set to a smaller value as strength of a connection between the estimation target object and the connection object becomes weaker.

15. An information processing method, comprising:
estimating an attribute value associated with an estimation target object, based on an attribute value associated with a connection object, wherein,
the attribute value is a value representing possession or absence of an attribute,
the estimation target object is one object in a universal set including a plurality of objects each associated with an attribute value, and
the connection object is an object connected with the estimation target object among the objects in the universal set,
the method further comprising:
estimating an attribute value representing the possession of the attribute as the attribute value associated with the estimation target object, in a case that objects associated with the attribute value representing the possession of the attribute are concentratedly located in a connection set composed of the connection objects in the universal set; and
determining whether the objects associated with the attribute value representing the possession of the attribute are concentratedly located in the connection set in the universal set, based on an internal density of the universal set and an internal density of the connection set, wherein
the internal density of the universal set has a value that becomes larger as a ratio of a number of objects associated with the attribute value representing the possession of the attribute among the objects in the universal set, to a number of the objects in the universal set, becomes larger, and
the internal density of the connection set has a value that becomes larger as a ratio of a number of the objects associated with the attribute value representing the possession of the attribute among the objects in the connection set, to a number of the objects in the connection set, becomes larger.

16. The information processing method according to claim 15, the method further comprising estimating the attribute value representing the possession of the attribute as the attribute value associated with the estimation target object, in a case that the internal density of the connection set is larger than a preset first threshold density.

17. A non-transitory computer-readable medium storing a program comprising instructions for causing an information processing device to realize an attribute value estimating unit for estimating an attribute value associated with an estimation target object, based on an attribute value associated with a connection object, wherein
the attribute value is a value representing possession or absence of an attribute,
the estimation target object is one object in a universal set including a plurality of objects each associated with an attribute value, and
the connection object is an object connected with the estimation target object among the objects in the universal set,
the information processing device further comprising the attribute value estimating unit for:
estimating an attribute value representing the possession of the attribute as the attribute value associated with the estimation target object, in a case that objects associated with the attribute value representing the possession of the attribute are concentratedly located in a connection set composed of the connection objects in the universal set; and
determining whether the objects associated with the attribute value representing the possession of the attribute are concentratedly located in the connection set in the universal set, based on an internal density of the universal set and an internal density of the connection set, wherein
the internal density of the universal set has a value that becomes larger as a ratio of a number of objects associated with the attribute value representing the possession of the attribute among the objects in the universal set, to a number of the objects in the universal set, becomes larger, and
the internal density of the connection set has a value that becomes larger as a ratio of a number of the objects associated with the attribute value representing the possession of the attribute among the objects in the connection set, to a number of the objects in the connection set, becomes larger.

18. The non-transitory computer-readable medium according to claim 17, wherein the attribute value estimating unit is configured to estimate the attribute value representing the possession of the attribute as the attribute value associated with the estimation target object, in a case that the internal density of the connection set is larger than a preset first threshold density.

19. An information processing device comprising:
a hardware processor; and
an attribute value estimating means, implemented on the hardware processor, for estimating an attribute value associated with an estimation target object, based on an attribute value associated with a connection object; wherein
  the attribute value is a value representing possession or absence of an attribute,
  the estimation target object is one object in a universal set including a plurality of objects each associated with an attribute value, and
  the connection object is an object connected with the estimation target object among the objects in the universal set,
the information processing device further comprising the attribute value estimating means for:
  estimating an attribute value representing the possession of the attribute as the attribute value associated with the estimation target object, in a case that objects associated with the attribute value representing the possession of the attribute are concentratedly located in a connection set composed of the connection objects in the universal set; and
  determining whether the objects associated with the attribute value representing the possession of the attribute are concentratedly located in the connection set in the universal set, based on an internal density of the universal set and an internal density of the connection set, wherein
the internal density of the universal set has a value that becomes larger as a ratio of a number of objects associated with the attribute value representing the possession of the attribute among the objects in the universal set, to a number of the objects in the universal set, becomes larger, and
the internal density of the connection set has a value that becomes larger as a ratio of a number of the objects associated with the attribute value representing the possession of the attribute among the objects in the connection set, to a number of the objects in the connection set, becomes larger.

* * * * *